United States Patent [19]
Reischl et al.

[11] 4,320,208
[45] Mar. 16, 1982

[54] PROCESS FOR THE PRODUCTION OF POLYURETHANE PLASTICS IN WHICH POLYISOCYANATES ARE REACTED WITH REACTIVE ORGANIC FILLERS COMPRISING BIOMASSES

[75] Inventors: Artur Reischl; Kuno Wagner, both of Leverkusen, Fed. Rep. of Germany

[73] Assignee: Bayer Aktiengesellschaft, Leverkusen, Fed. Rep. of Germany

[21] Appl. No.: 146,861

[22] Filed: May 5, 1980

[30] Foreign Application Priority Data

May 21, 1979 [DE] Fed. Rep. of Germany ....... 2920527

[51] Int. Cl.$^3$ .................... C08G 18/14; C08G 18/08
[52] U.S. Cl. .................................. 521/102; 521/99; 521/109; 521/137; 528/48; 528/52; 524/74; 524/72
[58] Field of Search ............... 521/99, 102, 109, 137; 528/48, 52

[56] References Cited

U.S. PATENT DOCUMENTS

| Re. 24,213 | 9/1956 | Van Blaricom et al. | 521/109 |
| 3,256,218 | 6/1966 | Kuox | 521/109 |
| 3,812,619 | 5/1974 | Wood et al. | 521/905 |
| 3,950,222 | 4/1976 | Takasaki | 195/68 |
| 3,959,191 | 5/1976 | Kehr et al. | 521/905 |
| 3,976,465 | 8/1976 | O'Donnell | 71/13 |
| 4,021,368 | 5/1977 | Nemec et al. | 252/427 |

FOREIGN PATENT DOCUMENTS

| 10243 | 4/1980 | European Pat. Off. . |
| 2208644 | 8/1973 | Fed. Rep. of Germany . |
| 2413137 | 10/1975 | Fed. Rep. of Germany . |
| 1517813 | 7/1978 | United Kingdom . |
| 1518746 | 7/1978 | United Kingdom . |

Primary Examiner—H. S. Cockeram
Attorney, Agent, or Firm—Gene Harsh; Joseph C. Gil

[57] ABSTRACT

This invention relates to a process for the production of optionally foamed polyurethane plastics, particularly shaped articles, using certain denatured biomasses as reactive fillers. The fillers in question comprise biomasses based on microorganisms and the derivatives and decomposition products of microorganisms, particularly biologically purified sludges, which have been deodorized and irreversibly denatured by reaction with isocyanates and/or carbonyl compounds and compounds capable of aminoplast and/or phenoplast formation.

14 Claims, No Drawings

PROCESS FOR THE PRODUCTION OF POLYURETHANE PLASTICS IN WHICH POLYISOCYANATES ARE REACTED WITH REACTIVE ORGANIC FILLERS COMPRISING BIOMASSES

BACKGROUND OF THE INVENTION

This invention relates to a process for the production of optionally foamed polyurethane plastics, particularly shaped articles, using certain denatured biomasses as reactive fillers. The fillers in question comprise biomasses based on microorganisms and the derivatives and decomposition products of microorganisms, particularly biologically purified sludges which have been deodorized and irreversibly denatured by reaction with isocyanates and/or carbonyl compounds and compounds capable of aminoplast and/or phenoplast formation.

In biological purification plants, organo-chemical effluent impurities are degraded, i.e. biologically eliminated, by means of microorganisms.

Under the conditions in purification plants, microorganisms multiply to a particularly marked extent producing a quantity of biomass consisting mainly of bacteria in the "activated sludge basin" of the purification plant which increases daily by from about 3 to 4% by weight, so that although some of the microorganisms die, the quantity of bacteria doubles in from 3 to 4 weeks. Accordingly, some of the biomass has to be continuously removed from the activated sludge basin in the form of "surplus activated sludge" in order to maintain optimal conditions for microbial effluent purification. Thus, biomasses accumulate worldwide in extremely large and ever-increasing quantities in the fully biological purification of industrial and communal effluents. In the Federal Republic of Germany alone, about two million tons (expressed as dry weight) per year of these protein-containing biomasses are presently either being dumped or burned. Also, the necessary removal of water from activated sludges still remains a problem because, under the sedimentation conditions normally applied in purification plants, the activated sludge to be removed contains only about 1% by weight of microbial dry mass. In conventional centrifuges the solids content of the sludge may only be concentrated to from 7 to 9% by weight. Even where polyelectrolytes are added and centrifuges and decanters are used, the solids content may be increased only to from 12 to 15% by weight.

Even in these low concentrations, activated sludges have a pronounced gel structure and a relatively high viscosity due to the pronounced chemical and physical binding of the water to the microorganisms. For this reason, conventional filtration is impossible without specialized treatment. Filtration is also complicated by the fact that bacteria cells attract one another and form common, slimy shells resulting in the formation of tacky flakes.

Another problem is that, as soon as it is isolated from the settling basin, the excess bacterial sludge immediately begins to putrefy and give off an intolerable odor. Even anhydrous activated sludge powder dried at 110° C. has a very unpleasant odor and continues to putrefy on becoming moist. The presence of pathogenic germs remains a problem.

For these reasons, the composting of the treated sludge or its direct use as a fertilizer in agriculture are possible only to a limited extent. Even today, therefore, the elimination and utilization of treated sludges involve considerable ecological problems which, despite all efforts, have not yet been solved satisfactorily.

Two new processes have been developed which enable various biomasses based on microorganisms or metabolism and/or decomposition products thereof, including in particular the above-described treated sludges from biological treatment plants, to be worked-up in surprisingly simple and economic manner. These work-up processes are the subject of separate applications and will be described in detail later. In the present context, "working-up" means that the biomasses are concentrated, irreversibly denatured, deodorized and, in this way, made available for utilization in the plastics industry.

DESCRIPTION OF THE INVENTION

The present invention relates to a process for the production of optionally cellular polyurethane plastics by the isocyanate polyaddition process comprising the reaction of:

(A) a polyisocyanate;
(B) a reactive organic filler;
(C) a low molecular weight and/or relatively high molecular weight compound containing isocyanate-reactive hydrogen atoms; and
(D) optionally blowing agents, catalysts and other known additives;

wherein the reactive organic filler comprises a biomass based on microorganisms and metabolism and or decomposition products thereof which has been irreversibly denatured and deodorized by reaction with isocyanates and/or by reaction with carbonyl compounds and compounds capable of aminoplast and/or phenoplast formation.

In the context of the present invention, "biomasses" are understood to be biosystems of microorganisms such as prokaryontae and eurkaryontae. Examples of such biosystems include: bacteria, yeasts, protozoa and other single-cell microorganisms, fungi, algae, etc., which may be present in the divided state, dormant state, in a state of partial or complete cell death or which may already be in the process of enzymatic decomposition or decomposition by foreign cultures. Some examples of such biosystems which, after being denatured are suitable for the reactive filler component of the process of the invention include:

1. Biomasses of microorganisms from biological purification plants.
2. Biomasses of the type which accumulate:
   (a) in processes for recovering products of the primary metabolism, i.e. for example, in the biotechnical production of ethanol, butanol, acetone, citric acid, lactic acid, tartaric acid, simple aliphatic carboxylic acids, amino acids, etc.;
   (b) in technical fermentation processes for the production of products of the secondary metabolism, for example in the production of antibiotics, vitamins, growth hormones, steroid hormones, alkaloids, etc.;
   (c) in processes for recovering cell constituents, such as enzymes, nucleic acids or polysaccharides; and
   (d) in processes for producing yeasts, for example for baking purposes, for alcoholic fermentation or for recovering proteins from methane, petroleum and methanol.

3. Biomasses of the type which accumulate in biotransformation processes, i.e. in processes where microorganisms are used as catalysts for organochemical reactions, such as oxidation, reduction, decarboxylation, phosphorylation, amination, deamination, acetylation, deacetylation reactions, etc.

Biomasses preferably used for the process of the invention include:

1. Biomasses from biological plants for the purification of industrial and communal effluents. Such biomasses consist of numerous types of bacteria, algae and fungi which function optimally at a P:N:C ratio of about 1:5:100 and which are known as omnivores. The biomasses from purification plants, which are also known as "activated sludges" may be used in the process of the present invention even when they contain traces of mercury, cadmium, zinc, iron, chromium and/or lead ions.

2. A variety of yeasts (fungi) from technical processes, for example from alcoholic fermentation processes.

3. Biomasses from the production of acetic acid, lactic acid, citric acid or tartaric acid and also from bacterial cultures fermenting through enzymatic processes.

4. Defective batches of yeast cultures.

5. Biomasses from the production of proteins based on various hydrocarbon sources, such as petroleum, paraffin cuts, methane or methanol. Particularly suitable biomasses of this type are biomasses based on certain yeast cells from industrial installations for the production of protein from petroleum fractions and defective parts of such biomasses. Such biomasses, particularly suitable for the process of the invention, are biomasses of single-celled microorganisms consisting of bacterial mixed cultures. Other suitable biomasses are biomasses of pseudomonas bacteria which are cultivated in fermenters at about 37° C. and from which high-protein feeds may be produced using methanol as the carbon source.

6. Biomasses from the production of penicillin, for example Penicillium notatum and Penicillium chrysogenum.

7. Biomasses from the final stage of the production of tetracycline (streptomycetes), biomasses from filament-like bacteria from the production of isiomycin (micromonospora) and other types of streptomyces.

8. Biomasses based on various other bacteria and fungi, of the type described in detail in co-pending U.S. patent application Ser. No. 84,002 pending Group 170 and numerous other microbial biomasses of the type described in the literature (cf. Synthesis 4, 120–134 and 147–157, 1969). These biomasses may consist of pure cultures and, of course, also of mixed cultures, i.e. of cultures which have been infected during fermentation processes and are therefore unusable. Such cultures themselves may contain or even be mixed with, for example, dead cells of vegetable origin or cell ingredients such as hemi-celluloses.

9. Algae, such as blue algae, green algae (for example chlorella), diatoms, conjugatae, flagellar algae, brown algae and red algae, and also protozoa.

10. Mixed cultures of various bacteria, fungi and algae and also cultures of biomasses which are infected with other types of fungi, bacteria, etc. and which have a complex composition. Examples of such mixed cultures are cultures of the type grown in open air and in moist form on spent residues in the process of decomposition of nutrient media such as gelatin, molasses, starches and other polysaccharides, and also on protein-containing, still-living or even already-decomposing algae.

11. Digested sludges and biosludges of various types and also biomasses containing large amounts of Escherichia coli and/or various suspended vegetable substances.

12. Biomasses from anaerobic (intensive) digestion processes; refuse/purified sludge composting products, for example from thermophilic digestion processes (aerobic-thermophilic processes); products obtained by the aerobic composting of purified sludge by the quick-rotting process; microbially infested fibrous sludges; sludges from the food and luxury-food industries, such as sludges from dairies and abattoirs; and biosludges which have been dried and dumped.

Mixtures of different biomasses may be used in the process of the invention. Suitable biomasses may also contain a variety of different impurities, for example, heavy metal salts, plant protection agents, antibiotics and other organic or inorganic chemicals.

Fillers particularly preferred for the process of the invention are those based on aqueous or dried powder-form, activated sludges from industrial and communal purification plants described above. These activated sludges do not have a defined composition, but instead consist of many types of bacteria, fungi and protozoa, depending on the contamination of the effluent and the biological conditions. Some examples of the many types of bacteria, fungi and protozoa contained in these sludges include: aerobacter aerogenes, *Corynebacterium laevaniformas, Paracolobactrum aerogenoides, Escheria intermedium, Escheria faecale,* Flavobacteria, Pseudomonas, Nitrosomonas and Nitrobacter geni and also *Shaerotilus natens* and white sulfur bacteria. In addition, enzymes, ferments and algae may also be present.

All the above-mentioned biomasses contain a variety of compounds containing H-acid groups which are capable of entering into polyaddition and polycondensation reactions with carbonyl compounds, aminoplast and phenoplast formers and isocyanates (cf. for example "Handbuch der Frischwasser und Abwasserbiologie", Volume II, page 620 (1960) by H. Lubmann). Examples of suitable compounds containing H-acid groups include: proteins such as lipoproteins and glycoproteins as constituents of enzymes; the enzymes themselves such as glucose oxidase, catalase, glucose isomerase, invertase, lactase, naringinase, lipases, asparaginases, $\alpha$-amylases and glycoamylases, cellulases, lysozymes, proteases, etc.; nucleoproteins, ribonucleic acids and deoxyribonucleic acids; phosphatides, particularly inositol phosphatide, colamine cephalin and serine sephalin; lipoids or plasmalogens providing they contain colamine bound in the form of a phosphoric acid ester as base; sugars and polysaccharide-like cell reserve substances and cell ingredients such as hemi-celluloses, starches, pectins and lignins. Suitable compounds containing H-acid groups also include: constituents of the cell walls of bacteria such as polymers of amino sugars (acetyl flucosamine + N-acetyl muramic acid) which are cross-linked by polypeptides in the N-acetyl muramic acid component; cell wall constituents of fungi and algae such as celluloses, hemi-celluloses; and other polysaccharides and chitin fractions with acetyl glucosamine and acetyl galactosamine fractions.

The reactive organic fillers used in the polyisocyanate polyaddition process of the invention are based on biomasses. The word "biomass" is meant to include microorganisms and constituents or decomposition products of microorganisms. Biomasses for the fillers may be denatured by reaction with isocyanates and/or carbonyl compounds and compounds capable of aminoplast and/or phenoplast formation. Processes for "working-up" biomasses so as to be suitable for utilization in the plastics industry are the subject of separate applications. In this context, "working-up" is to be understood to mean that the biomasses are concentrated, irreversibly denatured and deodorized so as to be suitable for utilization in the plastics industry. Two of these methods suitable for producing fillers for the process of the present invention are herein described in detail.

One of these processes for working-up a biomass comprises:

(a) condensing a biomass in a first reaction phase in aqueous medium with carbonyl compounds, thiocarbonyl compounds and/or carbonyl compounds which are in dissociation equilibrium with low molecular weight, uncondensed N-alkylol compounds, optionally in the presence of a catalyst, optionally in the presence of additives, and optionally with hydrolytic degradation or denaturing of the cell walls present in the biomass;

(b) reacting in a second reaction phase the unreacted carbonyl compounds, thiocarbonyl compounds and/or carbonyl compounds which are in equilibrium with low molecular weight uncondensed N-alkylol compounds from the first reaction phase, with aminoplast formers optionally containing N-alkylol groups or with phenoplast formers, the second reaction phase being carried out in aqueous medium optionally in the presence of a catalyst, optionally in the presence of chain-terminators and optionally in the presence of additives to produce a modified biomass; and (c) optionally freeing the resulting modified biomass from undesirable substances still present and/or optionally subjecting the resulting modified biomass to an after-treatment.

Another process for working up a biomass comprises:

(a) reacting from 5 to 98% by weight, preferably from 20 to 97% by weight, based on (a) and (b), of a biomass based on microorganisms and derivatives or decomposition products thereof; with (b) from 95 to 2% by weight, preferably from 80 to 3% by weight, based on (a) and (b), of a compound containing isocyanate groups; optionally in the presence of (c) water and/or an organic solvent; and optionally in the presence of (d) organic and/or inorganic additives; at temperatures of at least 50° C., preferably from 50° to 200° C. and most preferably from 80° to 150° C. The biomass is thus substantially completely denatured.

The biomass polyaddition products worked-up by the two above-described processes, are sterile, completely odorless in most cases, and denatured. The products are not tacky in aqueous phase, may be filtered without difficulty and dried in an energy-saving manner. They are completely stable in storage and free from pathogenic organisms. The total enzyme deactivation and complete cell death of cells in a biomass thus treated results in complete suppression of decomposition and putrefaction processes, fermentation, and unpleasant odor formation of enzymatically or microbiologically degradable cell ingredients. Accordingly, the process products may be stored indefinitely both in dry and also in moist form without giving off unpleasant odors and without undergoing further enzymatic degradation, and may readily be used at any time as fillers in the production of polyurethane plastics.

Various generally known carbonyl compounds containing sufficiently reactive carbonyl groups may be used for the denaturing process. Preferred carbonyl compounds are aldehydes and ketones.

Particularly preferred aldehydes include saturated aliphatic, optionally halogen- or hydroxy-substituted monoaldehydes such as formaldehyde, acetaldehyde, butyraldehyde, isobutyraldehyde, pival aldehyde, chloral hydroxy acetaldehyde, hydroxy pival aldehyde, glycerin aldehyde, hydroxy aldehydes of the type present in formose-sugar mixtures and hydroxy aldehydes formed from other aldehydes by aldol condensation reactions. Other particularly preferred aldehydes include: unsaturated aliphatic aldehydes such as acrolein and crotonaldehyde; cycloaliphatic aldehydes such as cyclohexane aldehyde; aliphatic dialdehydes such as glyoxal, methyl glyoxal, glyoxal sulfate and glutaric dialdehydes, aromatic aldehydes such as benzaldehyde, 4-methyl benzaldehyde, salicyclic aldehyde and terephthalic dialdehyde; and aldehydes derived from heterocyclic compounds such as furfurol and hydroxy methyl furfurol.

It is also possible to use "masked aldehydes", i.e. compounds which either release aldehydes or react like aldehydes under the reaction conditions. Such masked aldehydes include: paraformaldehyde; trioxane; chloral hydrate; hexamethylene tetramine; and semiacetals of aldehydes, particularly formaldehyde, with monofunctional, difunctional or higher polyfunctional alcohols such as methanol, ethanol, butanol, ethylene glycol and diethylene glycol.

Particularly preferred ketones include hydroxy acetone, dihydroxy acetone, methyl ethyl ketone, methyl isobutyl ketone, cyclohexanone, acetophenone, and quinones such as benzoquinone.

It is also possible to use mixtures of aldehydes and/or ketones, mixtures of formaldehyde with other aldehydes or ketones being particularly preferred. Hydroxy aldehydes and hydroxy ketones may be formed in situ by aldol condensation reactions from such mixtures of formaldehyde with aldehydes or ketones containing hydrogen atoms in the α-position, as illustrated in the following reaction scheme for formaldehyde and isobutyraldehyde:

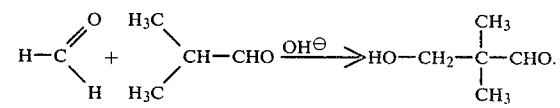

Ketones containing hydrogen atoms in the α-position may react correspondingly with formaldehyde. Hydroxy aldehydes and polyhydroxy ketones readily enter into addition reactions with, for example, urea and numerous aminoplast formers, particularly in the mildly to strongly alkaline range, to form N-alkylol compounds which in turn represent condensation partners for biomasses.

Suitable thiocarbonyl compounds which may be used as reaction components during the denaturing of the biomasses include various generally known thiocarbonyl compounds containing sufficiently reactive thiocarbonyl groups. Preferred thiocarbonyl compounds are thioaldehydes and thioketones. Particularly preferred thioaldehydes and thioketones include those derived from the aldehydes and ketones which have been mentioned above as being particularly preferred.

It is also possible to use "masked thioaldehydes", i.e. compounds which release thioaldehydes under the reaction conditions. Particular reference is made to trimeric thioformaldehyde (trithian) which decomposes into thioformaldehyde at elevated temperature in the presence of acids.

Carbonyl compounds which are in dissociation equilibrium with low molecular weight uncondensed N-alkylol compounds include, preferably, simple aldehydes, particularly formaldehyde, which are in equilibrium with the corresponding N-methylol compounds. Such N-methylol compounds, preferably, include N-methylol urea:

N,N'-dimethylol urea, methylolated dicyanodiamide, methylolated oxamide, N-methylol thiourea, N,N'-dimethylol thiourea and methylolated melamines such as hexamethylol melamine and tris-hydroxy methyl melamine corresponding to the formula:

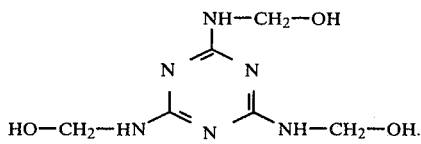

N-alkylol compounds suitable for the invention also include: monomethylol ethylene urea corresponding to the formula:

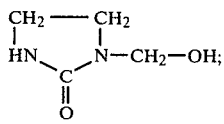

monomethylol ethylene thiourea corresponding to the formula:

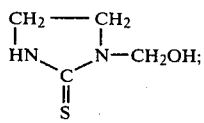

and tetramethylol acetylene diurea corresponding to the following formula:

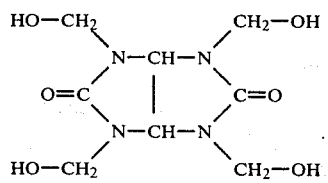

It is also possible to use alkylol compounds of the type derived from simple aldehydes, preferably those containing up to 5 carbon atoms.

The following are particularly preferred carbonyl compounds for carrying out the process of the invention: formaldehyde; acetaldehyde; isobutyraldehyde; crotonaldehyde; glyoxal; furfurol; hydroxy methyl furfurol; salicyclic aldehyde and semi-acetals thereof; polymers of formaldehyde such as paraformaldehyde and trioxane; hexamethylene tetramine; and thioaldehydes such as thioformaldehyde. The uncondensed (low molecular weight) N-alkylol compounds particularly preferred for carrying out the process of the invention are N-methylol urea, dimethylol urea, trimethylol melamine, hexamethylol melamine, monomethylene ethylene urea, monomethylol ethylene thiourea and tetramethylol acetylene diurea.

As mentioned above, aminoplast formers may also be used in the process of the invention for modifying the biomasses. In the context of the present invention, aminoplast formers are to be understood to be nitrogen compounds which are capable of forming N-oligocondensation and N-polycondensation products with reactive carbonyl compounds.

Aminoplast formers which correspond to the above definition include nitrogen compounds such as ureas, for example urea itself, acetylene urea, dimethyl acetylene urea and N-methylene urea; thioureas such as unsubstituted thiourea; and diureas such as hexamethylene diurea, tetramethylene diurea and ethylene diurea. Aminoplast formers also include polyureas of the type obtained by reacting aliphatic, cycloaliphatic or araliphatic diisocyanates or triisocyanates or even biuret-polyisocyanates with ammonia or primary amines; polycarboxylic acid amides such as oxalic acid diamide, succinic acid diamide and adipic acid diamide; and monourethanes, diurethanes and higher polyurethanes such as the reaction products of aliphatic, cycloaliphatic, araliphatic and aromatic mono- or bis-chloroformic acid esters with ammonia or primary amines. Suitable aminoplast formers also include biurets; melamines such as melamine itself; amidines such as dicyanodiamidine; guanidines such as aminoguanidine; guanazoles; guanamines; cyanoamide; dicyanodiamide; primary monoamines; secondary monoamines; aryl amines; ammonia; diamines; triamines; hydrazines; carboxylic acid hydrazides such as hydrazodicarbonamide; carbazinic acid esters and hydrazodicarboxylic acid esters. Additionally, similar nitrogen compounds capable of aminoplast formation can be used, preferably the derivatives containing N-alkylol groups, preferably N-methylol groups, corresponding to the above-mentioned nitrogen compounds and corresponding $C_1$–$C_4$ alkyl ethers of these N-alkylol derivatives.

Other preferred aminoplast formers include α,ω-diureas of relatively high molecular weight, N-methylol derivatives thereof and N-methylol alkyl ethers; α,ω-bis-alkoxy methyl urethanes containing polyether, polythioether, polyacetal, polyester, polyester amide or polycarbonate residues having an average molecular weight of from 400 to 10,000 and, optionally, additional urethane or substituted urea groups between the functional groups in the α,ω-position. Particularly preferred relatively high molecular weight nitrogen compounds capable of aminoplast formation include compounds which may be dissolved or dispersed in water such as compounds which, between the functional urethane or urea groups in the α,ω-position, contain polyethylene oxide residues or residues of copolymers of ethylene oxide with propylene oxide, with tetrahydrofuran or with water-soluble polyacetals produced from di-, tri- or tetraethylene glycol and formaldehyde.

Aminoplast formers suitable for use as starting compounds in the process of the invention are known or may be produced by known methods (cf. Houben-Weyl "Methoden der Organischen Chemie", Volume XIV, Part 2, 1963, pages 319–401, Georg Thieme-Verlag, Stuttgart).

"Modified aminoplast formers" may also be used as aminoplast formers for denaturing the biomasses. Modified aminoplast formers are aminoplast formers which contain additional groups readily capable of incorporation into the polymer molecule. Examples of modified aminoplast formers are compounds which may be rapidly and easily incorporated by mixed condensation. Preferred modified aminoplast formers include polyurethanes and polyureas containing terminal $NH_2$ groups; polyamides of poly-($\beta$-alanine) having molecular weights of up to 2000; N-methylol methyl ethers of polycaprolactam; polythiolactams; polypeptides of N-carboxy-$\alpha$-aminocarboxylic acids; low molecular weight polyamides of aliphatic dicarboxylic acids and diamines; polyamides of cycloaliphatic components and aromatic components; polyamides containing oxygen, sulfur or nitrogen as heteroatoms; polyester amides; mixed condensates which in addition to amide groups also contain ester, urethane or urea groups; ethoxylated and propoxylated monoamides and polyamides; polyhydrazides and polyaminotriazoles; polysulfonamides; formaldehyde mixed condensates with urea, melamine and dicyanodiamide; low molecular weight aniline/formaldehyde condensates; sulfonic acid amides; mononitriles and dinitriles; acrylonitrile; urotropin; hexahydrotriazines of primary amines and formaldehyde; Schiff's bases and ketimines or polyketimines such as those of 1 mol of hexamethylene diamine and 2 mols of cyclohexanone; polyaddition products and polycondensation products of melamine and other aminoheterocycles with aldehydes and alcohols; polyaddition and polycondensation products of nitriles with aldehydes; and reaction products of phosphorous acid and dialkyl phosphites with carbonyl compounds and amines or polyamines. Other suitable compounds capable of aminoplast formation include compounds described on pages 7 to 12 of German Offenlegungsschrift No. 2,324,134.

Other modified aminoplast formers which may be used in the denaturing process are N-alkylol compounds and, in particular, N-methylol compounds (which may be partly etherified) with low molecular weight and relatively high molecular weight polyfunctional hydroxyl compounds.

The following compounds in particular are suitable for use as aminoplast formers for carrying out the denaturing process: urea; thiourea; diureas such as hexamethylene diurea and tetramethylene diurea; ethylene urea; acetylene urea; dimethyl acetylene urea; oxalic acid diamide; succinic acid diamide; adipic acid diamide; mono- or bis-hydrazides such as hydrazodicarbonamide; carbazinic acid methyl and ethyl ester; hydrazodicarboxylic acid esters; monourethanes and, in particular, diurethanes such as the reaction products of aliphatic, cycloaliphatic, araliphatic and aromatic mono- or bis-chloroformic acid esters with ammonia and primary amines; aniline; melamine; dicyanodiamide; cyanoamide; aminoguanidine; dicyanodiamidine; guanamines; guanazoles; polyureas and polybiurets of the type obtained by reacting aliphatic, cycloaliphatic, araliphatic diisocyanates (or triisocyanates) and biuret polyisocyanates with an excess of ammonia or primary amines.

Other aminoplast formers which may be used are generally known azulmic acids, fault-containing so-called "modified acids", azulmic acids stabilized by condensation with carbonyl compounds, azulmic acids stabilized by condensation with carbonyl compounds and aminoplast formers or low molecular weight condensation products thereof, and also metal salt complexes of the above-mentioned azulmic acids. These compounds are preferably used together with other aminoplast formers, particularly urea. These various azulmic acids are known and are described in detail, for example, in Houben-Weyl, "Methoden der Organischen Chemie" (1952), Volume 8, page 261; in Angewandte Chemie 72, (1960), pages 379–384; in German Pat. Nos. 662,338 and 949,060; in German Offenlegungsschriften Nos. 2,806,019; and 2,806,020 (substantially corresponding to U.S. applications, Ser. Nos. 11,542; and 11,554) and in U.S. application Ser. No. 84,002 pending group 170.

Phenoplast formers suitable for use in the production of the denatured biomasses used in the present invention include the known phenols and derivatives thereof, such as phenol, cresol, bisphenol A, nitrophenol, pyrocatechol, hydroquinone and naphthol sulfonic acid. Other aminoplast and phenoplast monomers suitable for use as denaturing agents are described in German Offenlegungsschriften Nos. 2,324,134; 2,713,198; and 2,728,523 and in U.S. Ser. No. 84,002 pending group 170.

Various condensation catalysts may be used for accelerating the denaturing reaction of biomasses by means of carbonyl compounds and aminoplast or phenoplast formers. Such condensation catalysts include acids such as hydrochloric acid, sulfuric acid, nitric acid, phosphoric acid, phosphorous acid and other acids derived from phosphorous, formic acid, acetic acid, thioacetic acid, maleic acid and oxalic acid. Suitable catalysts for the denaturing reaction also include bases, such as sodium hydroxide, potassium hydroxide, calcium hydroxide, barium hydroxide, lead hydroxide, zinc oxide, magnesium oxide and other metal oxides and hydrates thereof. Additionally, salts may be used as catalysts, examples of which include: phosphates such as primary or secondary potassium hydrogen phosphate; ammonium sulfate; copper; zinc; tin(II); cadmium and magnesium salts of various organic acids. Additionally, numerous organic acid anhydrides and acid-yielding compounds such as ammonium chloride; trimethyl ammonium formate; chloral hydrate; amine salts of formic acid and other organic carboxylic acids; maleic acid semi-esters; tertiary amine salts and tertiary amines; dibenzoyl peroxide; carbonic acid; N-carbamic acids; glycol chlorohydrin; glycerol chlorohydrin and epichlorohydrin may be used as catalysts.

Preferred catalysts are acids such as phosphoric acid, phosphorous acid, nitric acid, hydrochloric acid, sulfuric acid, formic acid, oxalic acid and maleic acid and bases such as sodium hydroxide, potassium hydroxide, calcium hydroxide, barium hydroxide, lead hydroxide, benzyl dimethylamine and triethylamine.

Where phosphoric acid or sulfuric acid is used as the condensation catalyst, it may often be quantitatively deposited onto the products by precipitation with calcium ions or, in the case of phosphoric acid, by precipitation with iron or aluminum ions, so that the products do not have to be washed out and the effluent is thereby saved from pollution.

Various monofunctional compounds suitable for chain-terminating reactions may be used as chain-terminators in the denaturing process. It is preferred to use monofunctional chain-terminators such as ε-caprolactam, valerolactam, butyrolactam and the corresponding thiolactams; formamide and actamide; alcohols such as methanol, ethanol, propanol, butanol, allyl alcohol, isopropanol, oleyl alcohols and benzyl alcohol, which stop the growing aminoplast segments by etherification reactions. Other preferred chain-terminators include compounds of the type described on pages 13 and 14 of German Offenlegungsschrift No. 2,324,134. In one particular embodiment, N-methylol caprolactam, N-methylol valerolactam, N-methylolbutyrolactam and N-methylol azalactams may also function as chain-terminators. The last of these compounds have hitherto been unknown. However, they may be produced from the corresponding azalactams by methylolation with formaldehyde in known manner. The azalactams which can be used are known (cf. German Offenlegungsschrift No. 2,035,800).

In the denaturing of the biomasses by means of carbonyl compounds and aminoplast or phenoplast monomers, it may be advantageous to add hydroxyalkane phosphonic acid esters or hydroxyalkane phosphonic acids, particularly hydroxymethyl phosphonic acid ester or hydroxymethyl phosphonic acid, because these substances enter into co-condensation reactions with aminoplast formers via the hydroxymethyl group thereof and at the same time are catalytically active.

It may also be advantageous to add from 10 to 20% by weight of mononitriles and polynitriles such as acrylonitrile and, in particular, hydroxyacetonitrile, to the biomasses before the condensation reactions are carried out because hydroxyacetonitrile, for example, enters into co-condensation reactions in the presence of formaldehyde and aminoplast formers such as urea.

The described processes for denaturing biomasses are preferably carried out in aqueous media or in aqueous alcohol media. At the same time, inert organic solvents may be additionally used to remove the water azeotropically on completion of the reaction. However, it is preferred to use water without additional organic solvents as the reaction medium.

The reaction temperatures may be varied over a relatively wide range. In general, the reaction is carried out at temperatures of from 0° to 200° C., preferably from 10° to 150° C. However, it is also possible to complete the co-condensation reaction during the drying process, for example during spray-drying at temperatures of up to 250° C.

In many cases, the denaturing process may even be carried out advantageously at room temperature. In this case, pathogenic germs remaining may be killed by sterilization in the drying phase.

The denaturing reaction is generally carried out under normal pressure. However, it is also possible to work under elevated or reduced pressure. For example, the process may be carried out under elevated pressure at temperatures of from 120° to 160° C., in which case not only are the products sterilized, but also proteins, ribonucleic acid, deoxyribonucleic acid, nucleoproteins and/or other cell ingredients are also degraded as required.

In general, from about 0.1 to 6 mols, preferably from 0.2 to 5 mols, of carbonyl compounds, thiocarbonyl compounds and/or low molecular weight, uncondensed N-alkylol compounds in dissociation equilibrium with carbonyl compounds and from 0.1 to 6 mols, preferably from 0.2 to 5 mols, of aminoplast formers or phenoplast formers are added per kg of biomass (having a solids content of from 1 to 16% by weight). Optional materials including chain-terminators, catalysts and additives may be introduced in such a quantity that they are present in the end product in a proportion of from 1 to 95% by weight, preferably from 5 to 90% by weight.

Catalysts are generally used in quantities of from 0.05 to 10% by weight, preferably from 0.1 to 5% by weight, based on that total quantity of all the reaction components involved in the polycondensation reaction. In some cases, however, much higher catalyst concentrations may be used. For example, from 0.4 to 0.6 mol of acid catalyst, preferably phosphoric acid or nitric acid, may be used per 100 g of biomass and azulmic acids when the condensation reaction is carried out using azulmic acids. In this case, products in which the catalyst acids are fixed to basic groups of the co-condensates are formed.

Chain-terminators may be used in quantities of from 0.5 to 60% by weight, based on the total quantity of the starting compounds capable of aminoplast formation. Where N-methylol lactams or N-methylol azalactams are used as chain-terminators, the concentrations thereof generally range from 0.5 to 20% by weight, preferably from 2 to 14% by weight, based on the total quantity of aminoplast formers and carbonyl compounds or thiocarbonyl compounds.

Phenoplast formers may be used in quantities of from 0.5 to 100% by weight, based on the biomasses.

In general, the denaturing process is carried out by adding carbonyl compounds, thiocarbonyl compounds and/or carbonyl compounds in dissociation equilibrium with low molecular weight, uncondensed N-alkylol compounds, to an aqueous biomass dispersion optionally in the presence of additives and/or a catalyst, and initiating the first phase of the condensation reaction. The process is continued in a second phase by adding to the products of the first phase of condensation an aqueous solution of aminoplast formers (even partly alkylolated or partly methylolated products), phenoplast formers or an aqueous solution of still soluble aminoplast formers (for example, polyalcohol or polymethylol compounds) and optionally introducing additives, catalysts and chain-terminators. The condensation reaction is completed and the products optionally are subjected to after-treatment reactions. However, it is also possible initially to introduce aqueous dispersions or solutions of carbonyl compounds, thiocarbonyl compounds and/or carbonyl compounds in dissociation equilibrium with low molecular weight, uncondensed N-alkylol compounds and subsequently to add the aqueous biomass dispersion and optionally additives and/or catalysts to initiate the condensation reaction. The second phase of the reaction is then carried out in the same way as described above.

It is preferred to allow an acidified aqueous solution or dispersion of the aminoplast- or phenoplast-forming compounds to act on the biomasses at pH values of from about 1 to 4. In this case, the reactions take place very quickly. From 0.2 to 1.4 equivalents of carbonyl compounds may be allowed to act per $NH_2-$ or $NH-$ equivalent of all the reactants.

In another preferred procedure, aminoplast former and carbonyl compound are dissolved in water or lower alcohols and the resulting reactive solutions, in which there are equilibria between starting compounds and N-alkylolation or N-methylolation products, are added dropwise to the aqueous biomass dispersions with intensive stirring at temperatures of from 20° to 100° C. In a variant of this procedure, it is possible to add solutions of partly alkylolated (particularly partly methylolated) compounds or already partly precondensed, still soluble polyalcohol (particularly polymethylol) compounds all at once to the dispersed biomasses and then complete the condensation reaction in a basic or acidic range by applying heat with removal of the water under normal pressure or under reduced pressure.

It is also advantageous to add the compounds capable of aminoplast formation to an aqueous biomass dispersion in a first phase and subsequently alkylolate or methylolate them at a pH of from 7.5 to 10 by addition of the corresponding carbonyl compounds. The preformed N-alkylol or N-methylol compounds or even ethers thereof are allowed to react on the biomasses in the presence of insoluble aminoplast formers.

The reaction products are isolated by known methods. Generally, the solid reaction product is filtered off on completion of the reaction, washed and dried.

In many cases, it is advantageous to treat the co-condensates obtained with ammonia, primary or secondary amines applied in a liquid or gas phase after production of the co-condensates or to wash them with aqueous ammonia/hydrazine solutions, hydrazine hydrate, methyl hydrazine or aqueous cyanide solutions so as to quantitatively remove traces of formaldehyde or other aldehydes or ketones. Where the co-condensates are treated with ammonia or primary amines, small quantities of formaldehyde still present in the products condensed with formaldehyde are converted into hexamethylene tetramine or hexahydrotriazines. In many cases, it is advantageous to carry out an after-treatment with 25% aqueous ammonia solution. All such purifying operations may be carried out on an industrial scale, for example by gassing in a fluidized bed or in conjunction with the spray-drying of the products.

If after production the denatured products still contain catalyst residues, it is often preferable to wash out the catalyst residues or to chemically deactivate them by reaction with suitable reagents. Where acids or bases have been used as catalysts, it is preferable to neutralize them by the addition of appropriate bases or acids.

If after production the denatured products still contain soluble organic substances, such soluble organic substances may be removed by washing the products with organic solvents such as acetone.

The denaturing process may be carried out on an industrial scale in conventional vessels, screws or reaction vessels. In the case of biomasses which contain pathogenic germs, it is best to work in closed reactors in order to avoid the spread of bacteria by aerosol formation.

By means of the described denaturing process, it is even possible to deactivate completely biomasses which show a tendency to form resistant spores, particularly where highly reactive carbonyl compounds such as formaldehyde or crotonaldehyde are used. If necessary, the known processes of pasteurization may be applied in the case of particularly highly resistant spores. Pasteurization may be accomplished, for example, by completely deactivating traces of aldehyde present in the products with ammonia, subsequently adding peptones or dextrins, restimulating the spores at 37° C. for activation and cell division, and subsequently repeating co-condensation at from 70° to 80° C., optionally several times, for example with small quantities of monomethylol urea and formaldehyde.

The determination that sterilization of the biomasses takes place quickly and quantitatively in the denaturing process may be shown in known manner using sterile Petri dishes containing agar and peptones which are initially sterilized by exposure to a steam atmosphere in known manner, i.e. for about 40 minutes at 120° C. Measurements on nutrient media sterilized in this way and inoculated with the denatured products reveal no further nucleus formation under standardized test conditions in a saturated sterile atmosphere both after 24 hours and after 72 hours.

The biomasses used for the process of the invention may also be sterilized by carrying out the condensation reaction under greatly reduced pressure at a temperature of from 10° to 140° C. In this way, it is possible considerably to accelerate sterilization, plasmolysis and cell rupturing of the microorganisms such as bacteria, algae, yeasts, etc.

In order to achieve maximum cell destruction, enzyme deactivation and odor improvement with biomasses of various types while at the same time preventing valuable cell ingredients from being hydrolytically split into water-soluble products (i.e. protein degradation and polysaccharide degradation), it is particularly advantageous to initially condense the biomasses with from a 1 to 2 molar excess of aldehydes such as formaldehyde, isobutyraldehyde, crotonaldehyde or glyoxal for from 30 minutes to 2 hours at temperatures of from 20° to 100° C., preferably from 40° to 70° C., and at pH values of from 6 to 7.5 (i.e. in the substantially neutral range). Then after the addition of an aminoplast former such as urea, melamine or preferably urea-azulmic acid or melamine-azulmic acid, co-condensation is completed in the presence of phosphoric acid or sulfuric acid over a period of from 1 to 4 hours at pH values of from 1 to 4 and at temperatures of from 20° to 70° C. In this way, completely tack-free, readily filterable co-condensates in powder form having extremely high stability in storage are obtained with complete enzyme deactivation. Such co-condensates are completely germ-free.

In cases where it is desired to obtain particularly rapid enzyme deactivation, it is best to add from 0.5 to 2% by weight of water-insoluble aldehydes such as isobutyraldehyde and preferably crotonaldehyde, in the first phase of the condensation reaction before urea and formaldehyde are added.

The biomasses may optionally be pretreated before condensation with small quantities of oxidizing agents such as nitric acid, sodium hypochlorite, calcium hypochlorite, hydrogen peroxide, chromic acid or potassium permanganate. In this way, odor carriers are partly destroyed and the color of the filtrates is improved.

In another embodiment of the denaturing process, the aminoplast formers used are azulmic acids which, before the actual denaturing reaction, are partly condensed with carbonyl compounds such as formaldehyde, glyoxal or glyoxal sulfate in order to stabilize the azulmic acids against the elimination of hydrocyanic acid. The products obtained thereby are distinguished by particularly high thermal stability.

In another embodiment, urea, melamine or dicyanodiamide are initially introduced in aqueous solution. An azulmic acid and biomass are then dispersed in this solution. The resulting dispersion is condensed with formaldehyde and substantially insoluble melamine phosphate or urea oxalate. The melamine phosphate and urea oxalate are produced from unreacted melamine or urea by the addition of phosphoric acid or oxalic acid. In this embodiment, fault (i.e. structural defect) production in the azulmic acid and co-condensation take place simultaneously. The products formed are high-grade reactive fillers and flameproofing agents for polyurethane plastics.

In another embodiment, the denaturing process may be carried out in the form of a one-pot reaction. The biomasses are mixed with relatively large quantities of aminoplast formers such as urea and the resulting mixture pretreated at about 70° C. (optionally in the presence of other soluble aminoplast formers and optionally in the presence of monoalcohols and polyalcohols and small quantities of phenoplast formers such as phenol or o-cresol) followed by the addition of aldehydes such as crotonaldehyde and condensation with formaldehyde preferably at a pH of from 1 to 2.5.

In another embodiment of the process, from 100 to 500 parts by weight of approximately 30% aqueous sodium or potassium silicate solutions are added per 100 parts by weight of biomass during the co-condensation reaction. In this case, it generally is best to carry out condensation with the carbonyl compound and aminoplast former at from about 40° to 100° C. or subsequently to react the co-condensates with the above-mentioned quantities of alkali metal silicates. On completion of the reaction, excess dissolved sodium or potassium silicate may be precipitated simply by gassing the particular dispersions with carbon dioxide or by adding phosphoric acid or calcium chloride in admixture with potassium or sodium phosphates or calcium silicates. The products are compound fillers containing reactive groups.

In cases where it is desired to avoid, as far as possible during the denaturing process, protein hydrolysis of glycoproteins, nucleic acid and other cell ingredients, it is advantageous to initially condense the biomasses in the essentially neutral range at pH 7 with urea, formaldehyde and dimethylol urea or monomethylol urea in a dilution of about 60 g of urea per liter of aqueous biomass containing from 8 to 10% by weight of solids. The condensation is conducted at a temperature of from 60° to 80° C. in the presence of from 80 to 100 g of azulmic acids. Then the condensation mixture is cooled to from 35° to 20° C. Further condensation of the methylolation product is then initiated by acidification (pH=1.5 to 2.5). In this way, the hydrolyzed and water-soluble fraction of cell ingredients may be reduced to a minimum, particularly where various azulmic acids are used. In some cases, to help reduce the hydrolyzed and water-soluble fraction, it may be advantageous to use from 2 to 10% by weight of melamine or dicyanodiamide based on the urea used.

Since N-alkylol compounds and, in particular, N-methylol compounds may readily enter into etherification reactions in the acid pH range, the denatured biomasses may be modified by etherification reactions during production by using, for example, from 10 to 60% by weight of polyfunctional hydroxyl compounds. Examples of suitable polyfunctional hydroxyl compounds include polyalcohols such as ethylene glycol, glycerol, formose-sugar mixtures, glucose, poly- and oligosaccharides, starch, etc.

The fillers used in the process of the invention are preferably obtained by denaturing the biomasses with compounds containing isocyanate groups. These denaturing agents may be any low molecular weight or high molecular weight monoisocyanates or polyisocyanates such as aliphatic, cycloaliphatic, araliphatic, aromatic and heterocyclic polyisocyanates of the type described, for example, by W. Siefken in Justus Liebigs Annalen der Chemie, 562, pages 75 to 136. Examples of suitable isocyanates also include those corresponding to the general formula:

$$Q(NCO)_n$$

wherein
n=2 to 4, preferably 2; and
Q represents an aliphatic hydrocarbon radical containing from 2 to 18 carbon atoms, preferably from 6 to 10 carbon atoms, a cycloaliphatic hydrocarbon radical containing from 4 to 15, preferably from 5 to 10 carbon atoms, an aromatic hydrocarbon radical containing from 6 to 15 carbon atoms, preferably from 6 to 13 carbon atoms, or an araliphatic hydrocarbon radical containing from 8 to 15 carbon atoms, preferably from 8 to 13 carbon atoms.

Examples of such isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (German Auslegeschrift No. 1,202,785 and U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and -4,4'-diisocyanate and naphthylene-1,5-diisocyanate. It is also possible to use triphenylmethane-4,4',4''-triisocyanate; polyphenyl polymethylene polyisocyanates of the type obtained by condensing aniline with formaldehyde followed by phosgenation (described, for example, in British Pat. Nos. 874,430 and 848,671); m- and p- isocyanatophenyl sulfonyl isocyanates according to U.S. Pat. No. 3,454,606; perchlorinated aryl polyisocyanates of the type described, for example, in German Auslegeschrift No. 1,157,601 and U.S. Pat. No. 3,277,138; polyisocyanates containing carbodiimide groups of the type described in German Pat. No. 1,092,007, U.S. Pat. No. 3,152,162 and German Offenlegungsschriften Nos. 2,504,400; 2,537,685 and 2,552,350; norbornane diisocyanates according to U.S. Pat. No. 3,492,330; polyisocyanates containing allophanate groups of the type described, for example, in British Pat. No. 994,890, Belgian Pat. No. 761,626 and Dutch Patent Application No. 7,102,524; polyisocyanates containing isocyanurate groups of the type described, for example, in U.S. Pat. No. 3,001,973, German Pat. Nos. 1,022,789; 1,222,067 and 1,027,394 and German Offenlegungsschriften Nos. 1,929,034 and 2,004,048. Suitable isocyanates also include polyisocyanates containing urethane groups of the type described, for example, in Belgian Pat. No. 752,261 or in U.S. Pat. Nos. 3,394,164 and 3,644,457; polyisocyanates containing acylated urea groups according to German Pat. No. 1,230,778; polyisocyanates containing biuret groups of the type described, for example, in U.S. Pat. Nos.

3,124,605; 3,201,372 and 3,124,605 and British Pat. No. 889,050. Also suitable are polyisocyanates produced by telomerization reactions of the type described, for example, in U.S. Pat. No. 3,654,106; polyisocyanates containing ester groups of the type described, for example, in British Pat. Nos. 965,474 and 1,072,956, U.S. Pat. No. 3,567,763 and German Pat. No. 1,231,688. The reaction products of the above-mentioned isocyanates with acetals as described in German Pat. No. 1,072,385 and polyisocyanates containing polymeric fatty acid esters as described in U.S. Pat. No. 3,455,883 may also be used. It is also possible to use the isocyanate-containing distillation residues obtained in the production of isocyanates, optionally in solution in one or more of the above-mentioned polyisocyanates. It is also possible to use mixtures of the above-mentioned polyisocyanates.

It is preferred to use polyisocyanates such as 2,4- and 2,6-tolylene diisocyanate or mixtures of these isomers ("TDI"); polyphenyl polymethylene polyisocyanates of the type obtained by condensing aniline with formaldehyde followed by phosgenation ("crude MDI"); and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenylmethane diisocyanate.

To denature the biomasses, it is of course possible to use reaction products containing NCO groups produced by the reaction of polyisocyanates and high molecular weight and/or low molecular weight polyhydroxyl compounds (i.e. NCO-prepolymers generally known in polyurethane chemistry). Monoisocyanates such as methyl, benzyl, phenyl or tolyl isocyanates may also be used.

It is economically advantageous to denature the biomasses using the distillation residues which accumulate in the commercial production of isocyanates and for which practical uses have not previously been developed. The elimination of these residues has hitherto presented considerable problems (see German Offenlegungsschriften Nos. 2,846,815 and 2,846,809). Distillation residues particularly suitable for use in the invention are the substantially monomer-free, cross-linked distillation residues that are insoluble in inert organic solvents and which cannot be melted without decomposing. Such residues accumulate, for example, as slag in the removal of monomeric tolylene diisocyanates by distillation from the crude phosgenation products of tolylene diamines. These residues may be used optionally after stirring into water. Before use, the residues are ground into a powder having a mean particle size of less than 2 mm, preferably less than 500 mm, more preferably less than 200 mm, and most preferably less than 100 mm. The residues optionally may be chemically modified simultaneously and/or subsequently by reaction with compounds reactive to the functional groups of the distillation residues, particularly the isocyanate groups.

Distillation residues which can be used in the process of the invention automatically accumulate in conventional processes for the production of 2,4- and/or 2,6-tolylene diisocyanate on an industrial scale. They are in the form of relatively high molecular weight residue slags cross-linked through main valency bonds, and are generally formed in a quantity of more than 10% by weight, based on the calculated quantitative yield of monomeric diisocyanates. To make such residues easier to handle, they are generally introduced into water at a temperature above 150° C. which results in the formation of a coarse-grained, irregularly shaped insoluble slag in which a large number of the free isocyanate groups have reacted to form polyurea groups. Although the slag still has a small content of free NCO groups, generally less than 15% by weight (usually from 1 to 10% by weight), it is substantially free from monomeric diisocyanates. In addition to NCO groups, TDI residue slags contain urea, biuret, uretdione, isocyanurate, carbodiimide, uretone imine and, in some cases, methyl benzimidazoline groups and the biuretization products thereof in varying quantitative ratios. The slags are so highly crosslinked through these various functional groups that even after size-reduction to a mean particle size of less than 5μ, they are substantially insoluble in inert organic solvents such as methylene chloride, cyclohexane, cyclohexanone, toluene, xylene or dichlorobenzene even at boiling temperatures. Even in boiling dimethyl formamide, the residue powders are only partly swollen but not dissolved. On heating, only a very small proportion, if any, of the TDI distillation residues which can be used in the process of the invention softens at temperatures above about 250° C. Although beyond about 280° C., the distillation residues decompose without melting giving off gasses in the process.

The very coarse-grained TDI residue slag, which is optionally wetted with water or suspended in water during the denaturing process in a stirrer-equipped vessel, is preferably first precomminuted to less than 3 mm in a comminuting machine such as a cutting granulator or a hammer mill. The residue slag is then brought to any final particle size required for any stage of the process using known wet or dry grinding processes.

In cases where the TDI residues accumulate in water or are wetted with water such as in the denaturing process carried out on a large scale, wherein the reaction with the biomasses may be carried out in aqueous suspensions, it is particularly economical and environmentally desirable to subject the coarse TDI slag to wet grinding in the aqueous biomass suspension in batch-type or continuous machines optionally arranged one behind the other in two stages. The solids concentrations of these mixtures during wet grinding preferably amount to from 10 to 45% by weight. In addition to tube and ball mills, it is particularly advantageous to use toothed colloid mills, trigonal gear ring mills, corundum disc mills and stirrer-equipped ball mills depending on the required grain size.

In certain cases, some or all of the water may be replaced during grinding by another liquid selected depending on the subsequent application envisaged.

The TDI residue slags obtained after wet grinding (which contain different quantities of free NCO groups depending on the procedure adopted) may be used either in the form of very finely divided suspensions, pastes or powders (after isolation of the suspending agent) in the same manner as the TDI residue powders obtainable by dry grinding.

TDI residue slags which have been preground to less than from 2 to 3 mm and predried, preferably at temperatures below 50° C., and which have a moisture content of not much more than 15% by weight, preferably less than 5% by weight, are used for dry grinding. The choice of the particular machines used for dry grinding is essentially governed by final particle size and particle size distribution required and by the grinding costs. In comparison to plastics, the residue slags which may be used in the invention are very hard and, due to the high degree of crosslinking, may be gound without softening at temperatures up to about 220° to 300° C. in conventional size-reducing machines without cooling problems. This is particularly important when producing very fine particle sizes.

Grinding may be carried out, for example, in pinned-disc mills, ball mills or baffle plate mills, air-stream mills such as cross-beater mills, gear ring mills or turbine mills. However, it is preferable to use steam-jet or air-jet mills because, in mills of this type, size-reduction is primarily obtained by interparticle collisions and less by wall collisions so that very fine particle sizes may be obtained in a single passage.

Dry grinding may be carried out by single-stage, multi-stage, batch-type or continuous grinding processes.

As a result of wet or dry grinding, the residual reactive groups which are included in the residue slag are made available for a variety of chemical reactions with the biomasses. It is preferable to grind the TDI-residue slag as finely as possible to enable the polyaddition reactions with the biomasses to take place substantially quantitatively.

Further particulars on the production of the TDI residue powders used for denaturing the biomasses and a detailed description of possible modification reactions on the TDI residue slags with carbonyl compounds and/or isocyanate-reactive compounds may be found in earlier German Patent Application No. P 28 46 815.7 (German Offenlegungsschrift No. 2,846,815).

When isocyanates which are liquid under the reaction conditions or which are dissolved in an organic solvent are used, the denaturing reaction is preferably carried out at temperatures of from 50° to 200° C., more preferably from 80° to 120° C. Denaturing with TDI residue powders generally requires somewhat higher temperatures, for example from 70° to 200° C., preferably from 90° to 150° C. In cases where a solvent is used, the reaction temperature may generally be reduced by from about 20° to 30° C. in relation to the solvent-free procedure.

Denaturing of biomasses with compounds containing isocyanate groups may be carried out in various ways depending on whether dried biomasses or biomasses dispersed in water are used as the starting material. Where the process is carried out in the aqueous phase, biomasses having a solids content of from 0.3 to 20% by weight, preferably from 0.7 to 15% by weight, are generally used. The aqueous surplus, activated sludges from biological purification plants generally have a solids content of from 0.3 to 3% by weight, more particularly from 0.7 to 1.5% by weight. The quantity in which the isocyanate is used where the process is carried out in the aqueous phase amounts to from about 2 to 95% by weight, preferably from 3 to 80% by weight, based on the sum of the dry weight of the biomass and the weight of the isocyanate. The quantity of isocyanate is also governed by the type of isocyanate used. Low molecular weight monoisocyanates and polyisocyanates having molecular weights up to about 500 are preferably used in quantities of from 3 to 20% by weight, based on the sum of the isocyanate and the dry weight of the biomass. Relatively high molecular weight polyisocyanates (including TDI residue powders) are preferably used in quantities of from about 20 to 80% by weight, based on the sum of the isocyanate and the dry weight of the biomass. If the isocyanate is present in a stoichiometric excess in relation to the H-acid groups of the biomass, isocyanate polyaddition products containing free NCO-groups are obtained, which may be particularly advantageous for some applications using the products as reactive fillers.

Where a biomass dispersed in water is used as the starting material for denaturing with isocyanates, it is advantageous, particularly if the starting material is relatively coarse, to also use an organic solvent in a quantity of up to 30% by weight, preferably from 2 to 15% by weight, based on the dispersion, in order to facilitate the reaction between the generally hydrophilic isocyanates and the aqueous biomass. The organic solvent used is preferably at least partly miscible with water. Suitable solvents include, for example, acetone, methyl and ethyl alcohol, benzene, toluene, ethyl acetate and mixtures thereof.

Where the process is carried out in the aqueous phase, it is preferred to use temperatures of from 80° to 130° C. It is also possible to conduct the process under excess pressure of, for example, from 2 to 100 bars. The pH value is generally from 1 to 10, preferably from 4 to 8 and, if necessary, is adjusted to the required range by the addition of acids, alkali or ammonia. The application of high temperatures and low pH values during the isocyanate polyaddition reaction promotes plasmolysis, i.e. shrinkage of the protoplasm, and partial hydrolysis of the cell material.

The polyaddition reaction between biomass and isocyanates may be carried out both in batches in conventional reaction vessels and also (optionally in combination therewith) continuously, for example in straight-flow mixers of the type described, for example, in German Pat. No. 2,513,815 (U.S. Pat. No. 4,089,835) or in multiphase reaction tubes according to German Offenlegungsschrift No. 2,719,970 (U.S. Pat. No. 4,119,613) and the literature cited therein. In the continuous processes, the average residence time of the reaction mixture of concentrated aqueous biomass, isocyanate and, optionally solvent, preferably amounts to from between about 2 to 20 minutes, more preferably from 1 to 5 minutes, for temperatures near the boiling point. It is advantageous to use a multiphase flow-type reaction tube because substantially quantitative drying of the polyaddition product is also obtained in this way. Where the polyaddition reaction is carried out in batches in conventional reaction vessels, the surplus activated sludge from biological purification plants is denatured and flocculated by the polyaddition reaction with isocyanates to such an extent that the products may be isolated by straightforward filtration with a solids content of more than 50% by weight even without filtration aids which would otherwise be necessary.

Where substantially anhydrous biomass powders are used for the denaturing reaction with isocyanates, it may be assumed that cell death has already occurred to some extent leaving only a small residue of living cells. However, an activated sludge powder, for example, still has an intolerable odor as the latent residual cell activity. This odor and residual cell activity may be completely eliminated by the isocyanate polyaddition reaction. To completely eliminate the odor and residual cell activity, the powder-form biomass may be suspended in a large excess of a liquid monoisocyanate or polyisocyanate. The addition reaction takes place at temperatures as low as room temperature, although over a period of a few days. It is preferable to heat the mixture briefly (preferably for from 3 minutes to 3 hours depending on the temperature) to a temperature of from about 50° to 130° C. and, after reaching a constant NCO content, to remove the excess unused low molecular weight isocyanate, optionally by means of a solvent such as acetone. A powder-form insoluble biomass polyisocyanate having an NCO content which may amount to more than 15% by weight is obtained in this way. The reaction of the dry biomass with an equivalent or subequivalent quantity of isocyanates leads to NCO-free, sterilized biomass polyaddition products. In this embodiment of the process, the isocyanate is used in a quantity of from 2 to 98% by weight, preferably from 5 to 70% by weight based on the total quantity of biomass and isocyanate. The reaction may be carried out either with or without organic solvents. If the reaction is conducted with an organic solvent, the solvent is used in a quantity of from 1 to 50% by weight, preferably from 5 to 20% by weight, based on the reaction mixture. Where a substantially anhydrous biomass and, optionally a liquid organic dispersant are used, a batch process using conventional reaction vessels may be used, although it is preferable to perform the process continuously in known straightflow mixers, multiphase reaction tubes or reaction screw extruders.

It is advantageous to carry out the process substantially in the absence of water or solvents, especially when the powder-form TDI residue slags are used as the isocyanate component.

Especially when apart from the biomass the reaction mixture contains only small quantities of liquid components (for example, solvents, moisture or liquid reactants for the biomass) and preferably when the powder-form TDI residue slags are used as the isocyanate component, it is particularly advantageous to apply two techniques which may optionally be coupled with one another. The first is the known centrifuging and fluidizing technique using mechanically active mixers or mixing tools and the second is the fluidized bed technique. For the first technique, it is best to use generally known heatable and coolable mixers in which, for example, plowshare-like blades are arranged on a rotatable shaft and, optionally independently movable cutter heads are mounted in the mixing drum. Once the process conditions such as temperature and residence time under which a substantially powder-like form may be maintained during the denaturing reaction are determined (for example, by laboratory tests and pilot tests in from 100 to 200 liter mixers), it is possible to use large-capacity mixing units, optionally arranged one behind the other, for producing commercial quantities of biomass/isocyanate polyaddition products.

When using the fluidized bed technique for given solids data, such as density, particle sizes and distribution and for the selected flow medium such as air or nitrogen, the optimum state of fluidization in the fluidized bed is determined essentially by the difference between the loosening rate and the rate of flow of the flow medium. This optimum state may readily be determined by a few preliminary tests carried out in a small laboratory fluidized bed. The optional use of liquid or gaseous reaction components should be taken into account when conducting these preliminary tests.

Where the fluidity of a packing proves to be inadequate during the process, i.e. where a certain tackiness occurs, it is possible to use a granular material of higher specific gravity, for example quartz sand, and to isolate the polyadduct in a cyclone. In fluidized beds characterized by high flowthrough rates, fine size reduction of the biomass may be obtained by vigorous agitation of the solids, possibly even during the denaturing reactions.

It is possible to carry out condensation reactions with carbonyl compounds and, optionally compounds suitable for aminoplast and/or phenoplast formation in the biomass before, after or during the denaturing reaction with compounds containing isocyanate groups, for example in the same way and with the same starting materials as previously described in the embodiments for working-up a biomass.

In one embodiment, formaldehyde is allowed to act on the biomass. Depending on the pH, the biomass initially undergoes methylolation only or, preferably in the strongly acid range, a cross-linking reaction which results in the formation of methylene bridges. In addition to a carbonyl compound suitable for condensation with the biomass, it is also possible, as mentioned above, to add other compounds capable of condensation. Additionally, however, compounds capable of condensing with carbonyl compounds are also formed during the isocyanate polyaddition reaction itself. It is particularly advantageous to add urea or to form urea groups capable of condensation, and also to use azulmic acid (cf. for example, the summary by Th. Volker in Angewandte Chemie 1960, pages 379–384) which, as a polymeric hydrocyanic acid, contains numerous amino groups reactive to isocyanates.

Before they are used as fillers in the process of the invention, the denatured biomass may be further modified in various ways, optionally in the presence of diluents such as anhydrous organic solvents for example, at temperatures of from 0° to 200° C., preferably from 10° to 140° C., using a variety of reagents. Chemical reactions take place essentially on the surface of the products, so that chemically surface-modified products are obtained.

Chemical surface modification of denatured biomasses is preferably obtained by:

(1) treatment with urea melts;

(2) treatment with acylating agents such as formic acid, acetic acid anhydride or mixed acid anhydrides of acetic acid and oleic acid preferably in the presence of sodium or potassium acetate; with cyclic acid anhydrides such as maleic acid anhydride, phthalic acid anhydride or hexahydrophthalic acid anhydride; with melts of dicarboxylic acids such as adipic acid, hexahydrophthalic acid or trimellitic acid; with inorganic acid chlorides such as cyanogen chloride, phosgene, thionyl chloride, sulfur chlorides, phosphorus oxychloride, phosphorus pentachloride, silicon tetrachloride, antimony trichloride or titanium tetrachloride; with inorganic acid chlorides such as acetyl chloride, benzoyl chloride, chloroformic acid esters, benzene sulfonic acid chlorides, phosphoric acid ester chlorides, chloromethane sulfochloride or cyanuric acid chloride;

(3) treatment with alkylating agents such as dimethyl sulfate, methyl iodide or methyl bromide, dichloroethane, glycol chlorohydrin, chloroacetic acid ethyl ester, dichloroacetic acid ethyl ester, chloroacetaldehyde, diethyl acetal, allyl chloride, benzyl chloride, trichloromethyl isocyanide dichloride or other isocyanide dichlorides;

(4) treatment with ε-caprolactam, ε-caprolactone, hydroxy pivalic acid lactone, cyclic 6-membered or 8-membered siloxanes, azalactams of the type known from German Offenlegungsschrift No. 2,035,800, glycol carbonate, ethylene oxide, propylene oxide, butylene oxide, styrene oxide, epichlorohydrin, butyrolactone, valerolactone, oxazolidines, oxazolines, imidazolides, isatoic acid anhydride or Leuch's anhydrides or aminoacids and phosgene;

(5) treatment with acrylonitrile or other vinyl monomers such as acrylic acid, methacrylic acid or the methyl, ethyl, β-hydroxy ethyl or propyl esters thereof;

(6) treatment with hydroxy alkane phosphonic acid esters or the parent acids, particularly with hydroxy methyl phosphonic acid esters or with the free hydroxy methyl phosphonic acid;

(7) treatment with chloromethyl alkoxy silanes;

(8) treatment with a variety of mononitriles or polynitriles, preferably hydroxy metal nitrile, under the conditions of Thorpe's reaction catalyzed by hydroxy groups;

(9) treatment with polyisocyanates of the type described previously in the presence of isocyanate-reactive compounds known from polyurethane chemistry (particularly polyols having a molecular weight of from 62 to 500). In this way, the denatured biomass may be surrounded by a polyurethane shell without the material losing its powder-form consistency. A similar effect is obtained by after-treating the denatured biomass still containing free NCO groups with polyols.

Other suitable after-treatment reagents include sodium hydroxide, potassium hydroxide, calcium hydroxide, sodium sulfide, Rongalite, ammonium polysulfides, diethyl phosphite and dimethyl phosphite.

During these after-treatment reactions, a variety of copolymerization or polymerization reactions involving vinyl monomers may be carried out. In this case, the biomass mixed condensates are surrounded or microencapsulated by the polymer formed. The "shell materials" may, of course, be used in a large excess.

In certain cases, the modification reactions on the biomass discussed above may even be carried out before or at the same time as the denaturing reactions using carbonyl compounds and compounds capable of aminoplast and/or phenoplast formation and/or using isocyanates. It is also possible after the polyaddition reaction to produce from the products polymethylene ureas, polyalkylidene ureas and other substantially insoluble or completely insoluble compounds such as highly cross-linked aminoplast condensates which, due to their insolubility, show virtually no covalent bonding to the biomass. Such mixtures, in which the quantity of the noncovalently bound fraction of aminoplast condensates or phenoplast condensates may be varied as required are useful flameproofing agents for a variety of plastics, particularly where they are charged with polymethylene thioureas, cross-linked polymethylene melamine powders, urea/hydrazodicarbonamide/formaldehyde condensates and dicyanodiamide or oxamide condensates.

It is also advantageous subsequently to charge the denatured biomass with substantially insoluble melamine phosphate, substantially insoluble urea oxalate, urea nitrate or substantially insoluble ammonium magnesium phosphate. The addition to the denatured biomass of alumina hydrates, aluminum oxides, calcium carbonate, quartz powder and the addition of linear or cross-linked polymethylene ureas, powdered melamine/formaldehyde condensates, urea/hydrazodicarbonamide condensates and high molecular weight polyammonium polyphosphates is also advantageous. The products thus obtained are particularly suitable for use as flameproofing agents for plastics.

In addition, other additives which may be used in the process of the invention, particularly where azulmic acids are used include sugars such as cane sugar and other sugars which do not contain free aldehyde groups or even formose-sugar mixtures produced from formaldehyde. These various types of sugars may be fixed in passages and pores of the azulmic acid. In addition, the various sugars may even be attached to the mixed condensates in the form of substantially insoluble calcium complexes thereof.

In addition, when the polyadducts contain azulmic acids, it is possible simultaneously to gas the products with ammonia and/or carbon dioxide after production. Such gassing causes small ammonia and carbon dioxide molecules to penetrate into the azulmic acid skeleton to a considerable extent.

In addition to the reactive aminoplast, phenoplast and vinyl monomers, isocyanates and other reactive low molecular weight compounds which have been described in detail, it is possible to add to the biomass before, during or after the denaturing reaction, a variety of different fillers and additives. Such fillers and additives include, for example, organic naturally occurring substances and products obtained therefrom, inorganic naturally occurring substances and products obtained therefrom, synthetic organic products, synthetic inorganic products and/or mixed organic-inorganic products.

Preferred naturally occurring organic substances and products obtained therefrom include wood powder or chips; lignin powder; lignin sulfonic acids; ammoniated lignin sulfonic acids; humus; huminic acids; ammoniated huminic acids; peat; proteins and degradation products thereof (for example, polypeptides such as wool and gelatin); fish meal and bone meal; pectins; polysaccharides (such as starch and celluloses); hemicelluloses; homogenized materials of vegetable and animal origin; activated carbon; and ashes obtained by the incineration of organic substances formed by photosynthesis or conventional fuels.

Preferred naturally occurring inorganic substances and products obtained therefrom include: silicates such as aluminum silicates, calcium silicates, magnesium silicates and alkali metal silicates; silicas, particularly disperse silicas; silica gels; clay minerals; mica; carbonates such as calcium carbonate; phosphorite; phosphates such as calcium phosphate and ammonium magnesium phosphate; and sulfates such as calcium sulfate.

Preferred synthetic organic products include: natural or synthetic rubbers; polyamides; epoxide resins; and aminoplast and phenoplast resins which have been described previously.

Other particularly suitable additives are powder-form TDI residue slags of the type described above of which the NCO groups have been quantitatively removed by reaction with water or other H-acid compounds (TDI distillation residues modified in this way are described in German Offenlegungsschriften Nos. 2,846,809 and 2,846,815). Even if they are free from NCO groups, such powders contain numerous reactive groups (for example urea, urethane, carbodiimide and/or uretdione groups) which may participate in the polyaddition and polycondensation reactions taking place in the denaturing process.

FURTHER DESCRIPTION OF THE PROCESS OF THE INVENTION FOR THE PRODUCTION OF POLYURETHANE PLASTICS

Suitable polyisocyanates (component A) for the process of the invention include the compounds containing NCO groups described above in connection with the denaturing of biomasses. Preferred starting components for the production of the polyurethane plastics include: 2,4- and 2,6-tolylene diisocyanate and mixtures of these isomers ("TDI"); 4,4'-diphenylmethane diisocyanate; polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenylmethane diisocyanate.

In addition to the denatured biomass serving as reactive filler (component B) and the polyisocyanates (component A), low molecular weight and/or relatively high molecular weight compounds containing isocyanate-reactive hydrogen atoms (component C) may optionally be used as an additional reactant in the process of the invention. In addition to compounds containing amino groups, thiol groups or carboxyl groups, such relatively high molecular weight compounds (i.e. having a molecular weight of from 400 to 10,000) preferably include compounds containing hydroxyl groups, preferably those having molecular weights of from 500 to 8000, more preferably from 1000 to 5000. Examples of suitable compounds containing hydroxyl groups include polyesters, polyethers, polythioethers, polyacetals, polycarbonates and polyesteramides containing at least 2, generally from 2 to 8, but preferably from 2 to 4 hydroxyl groups of the type known for the production of noncellular/cellular polyurethanes.

Examples of polyesters containing hydroxyl groups suitable for use in the invention include: reaction products of polyhydric, preferably dihydric, and optionally trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example, by halogen atoms and/or may be unsaturated.

Examples of such carboxylic acids and derivatives thereof include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids, optionally in admixture with monomeric unsaturated fatty acids, such as oleic acid; terephthalic acid dimethyl ester and terephthalic acid-bis-glycol ester. Examples of suitable polyhydric alcohols include: ethylene glycol; 1,2- and 1,3-propylene glycol; 1,4- and 2,3-butylene glycol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; 1,2,4-butane triol; trimethylol ethane; pentaerythritol; quinitol; mannitol; sorbitol; formitol; methyl glycoside; diethylene glycol; triethylene glycol; tetraethylene glycol and higher polyethylene glycols; dipropylene glycol and higher polypropylene glycols; and dibutyl glycol and higher polybutylene glycols. The polyesters may contain terminal carboxyl groups. Polyesters of lactones, for example $\epsilon$-caprolactone, or of hydroxy carboxylic acid, for example $\omega$-hydroxy caproic acid, may also be used.

The polyethers containing at least 2, generally from 2 to 8, preferably 2 or 3 hydroxyl groups suitable for use in the invention are generally known and are obtained, for example, by the self-polymerization of epoxides such as ethylene oxide, propylene oxide, butylene oxide, tetrahydrofuran, styrene oxide or epichlorohydrin, for example in the presence of Lewis catalysts such as $BF_3$; or by the addition of these epoxides, preferably ethylene oxide and propylene oxide, optionally in admixture or successively, with starter components containing reactive hydrogen atoms. Examples of starter components containing reactive hydrogen atoms include: water, ammonia, alcohols or amines, for example ethylene glycol, 1,3-propylene glycol, 1,2-propylene glycol, trimethylol propane, glycerol, sorbitol, 4,4'-dihydroxy diphenylpropane, aniline, ethanolamine or ethylene diamine. Sucrose polyethers of the type described, for example, in German Auslegeschriften Nos. 1,176,358 and 1,064,938 and formitol- or formose-started polyethers (German Offenlegungsschriften Nos. 2,639,083 and 2,737,951) may also be used in the invention. It is often preferable to use polyethers which contain substantially primary OH groups (i.e. up to 90% by weight OH group based on all the OH groups present in the polyether). Polybutadienes containing OH groups are also suitable for use in the invention.

Suitable polythioethers include the self-condensation products of thiodiglycol and/or the condensation products of thiodiglycol with other glycols, dicarboxylic acids, formaldehyde, aminocarboxylic acids or amino alcohols. Depending on the co-components, the products include, for example, polythio mixed ethers, polythioether esters and/or polythioether-esteramides.

Suitable polyacetals include, for example, the compounds obtainable from the reaction of glycols such as diethylene glycol, triethylene glycol, 4,4'-dioxethoxy diphenyl dimethylmethane and hexane diol, with formaldehyde. Polyacetals suitable for use in the invention may also be obtained by polymerizing cyclic acetals such as trioxane (German Offenlegungsschrift No. 1,694,128).

Suitable polycarbonates containing hydroxyl groups are known and may be obtained, for example, by reacting diols such as 1,3-propane diol; 1,4-butane diol and/or 1,6-hexane diol; diethylene glycol; triethylene glycol; tetraethylene glycol or thiodiglycol with diaryl carbonates, for example diphenyl carbonate, or with phosgene (German Auslegeschriften Nos. 1,694,080; 1,915,908 and 2,221,751 and German Offenlegungsschrift No. 2,605,024).

Suitable polyester amides and polyamides include, for example, the predominantly linear condensates obtained, for example, from polybasic saturated or unsaturated carboxylic acids or anhydrides thereof and polyfunctional saturated or unsaturated amino alcohols, diamines, higher polyamides and mixtures thereof.

Polyhydroxyl compounds already containing urethane or urea groups and optionally modified natural polyols such as castor oil, or carbohydrates such as starch, may also be used. Addition products of alkylene oxides with phenol/formaldehyde resins or even with urea/formaldehyde resins may also be used in the present invention.

Before they are used in the polyisocyanate-polyaddition process, the above-mentioned polyhydroxyl compounds may be modified in various ways. Thus, according to German Offenlegungsschriften Nos. 2,210,839 (substantially corresponding to U.S. Pat. No. 3,849,515) and 2,544,195, a mixture of different polyhydroxyl compounds (for example, a polyether polyol and a polyester polyol) may be condensed by etherification in the presence of a strong acid to form a relatively high molecular weight polyol which is made up of different segments attached through ether bridges. It is also possible, for example in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acid esters. The reaction of a polyol with an approximately equivalent quantity of a diisocyanato-carbodiimide, followed by reaction of the carbodiimide group with an amine, amide, phosphite or carboxylic acid, produces polyhydroxyl compounds containing guanidine, phosphonoformamidine or acyl urea groups (German Offenlegungsschriften Nos. 2,714,289; 2,714,292 and 2,714,293). In some cases, it is particularly advantageous to either completely or partly convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. Relatively high molecular weight compounds containing terminal amino groups are obtained in this way.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 1,694,152 (substantially corresponding to U.S. Pat. No. 3,625,871).

It is also possible to use polyhydroxyl compounds containing high molecular weight polyadducts and polycondensates or polymers in finely dispersed or dissolved form. Such polyhydroxyl compounds are obtained, for example, by carrying out polyaddition reactions (for example, reactions between polyisocyanates and amino-functional compounds) and polycondensation reactions (for example, between formaldehyde and phenols and/or amines) in situ in the above-mentioned compounds containing hydroxyl groups. Such processes are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695 and German Auslegeschrift No. 1,152,536) or polycarbonate polyols (German Pat. No. 1,769,795 and U.S. Pat. No. 3,637,909) are also suitable for use in the process according to the present invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and optionally (meth) acrylonitrile, (meth)acrylamide or OH-functional (meth)acrylic acid esters. Polyhydroxyl compounds into which carboxyl groups have been introduced by radical graft polymerization with unsaturated carboxylic acids and optionally other olefinically unsaturated monomers (German Offenlegungsschriften Nos. 2,714,291; 2,739,620 and 2,654,746) may be used advantageously in combination with mineral fillers.

Where modified polyhydroxyl compounds are used as starting components in the polyisocyanate-polyaddition process, polyurethanes having considerably improved mechanical properties are obtained in many cases.

Representatives of the above-mentioned compounds suitable for the invention are described, for example, in High Polymers, Volume XVI, "Polyurethane, Chemistry and Technology", by Saunders-Frisch, Interscience Publishers, New York/London, Volume I, 1962, pages 32 to 42 and pages 44 to 54 and Volume II, 1964, pages 5–6 and 198–199, and in Kunststoff-Handbuch, Volume VII, Vieweg-Hochtlen, Carl-Hanser-Verlag, Munich, 1966, for example on pages 45 to 71. It is, of course, possible to use mixtures of the above-mentioned compounds containing at least two isocyanate-reactive hydrogen atoms and having a molecular weight of from 400 to 10,000 such as mixtures of polyethers and polyesters.

In some cases, it is particularly advantageous to combine low-melting and high-melting polyhydroxyl compounds (German Offenlegungsschrift No. 2,706,297).

Additionally, compounds containing at least two isocyanate-reactive hydrogen atoms and having a molecular weight of from 32 to 400 may also be used in the invention. Here, too, these compounds contain hydroxyl groups and/or amino groups and/or thiol groups and/or carboxyl groups, preferably hydroxyl groups and/or amino groups and serve as chain-extenders or cross-linkers. These compounds generaly contain from 2 to 8, preferably from 2 to 4, isocyanate-reactive hydrogen atoms. It is possible to use mixtures of different compounds containing at least two isocyanate-reactive hydrogen atoms and having a molecular weight of from 32 to 400. Examples of such compounds include: ethylene glycol; 1,2- and 1,3-propylene glycol; 1,4- and 2,3- butylene glycol; 1,5-pentane diol; 1,6-hexane diol; 1,8-octane diol; neopentyl glycol; 1,4-bis-hydroxymethyl cyclohexane; 2-methyl-1,3-propane diol; dibromobutene diol (U.S. Pat. No. 3,723,392); glycerol; trimethylol propane; 1,2,6-hexane triol; trimethylol ethane; pentaerythritol; quinitol; mannitol; sorbitol; castor oil; diethylene glycol; triethylene glycol; tetraethylene glycol; higher polyethylene glycols having a molecular weight of up to 400; dipropylene glycol; higher polypropylene glycols having a molecular weight of up to 400; dibutyl glycol; dibutylene glycol; higher polybutylene glycols having a molecular weight of up to 400; 4,4'-dihydroxy diphenylpropane; dihydroxy methyl hydroquinone; ethanolamine; diethanolamine; N-methyl diethanolamine; triethanolamine and 3-aminopropanol.

Other low molecular weight polyols suitable for the invention include mixtures of hydroxy aldehydes and hydroxy ketones ("formose") or polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). In order to obtain plastics having improve fire resistance, these formoses are advantageously used in combination with aminoplast formers and/or phosphites (German Offenlegungsschriften Nos. 2,738,513 and 2,738,532). Solutions of polyisocyanate-polyaddition products, particularly solutions of polyurethane ureas containing ionic groups and/or solutions of polyhydrazodicarbonamides, in low molecular weight polyhydric alcohols may also be used as polyol component in the invention (German Offenlegungsschrift No. 2,638,759).

Examples of aliphatic diamines suitable for use in the invention include: ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenylmethane; p-xylene diamine; bis-(3-aminopropyl)-methylamine; diaminoperhydro anthraceness (German Offenlegungsschrift No. 2,638,731) and cycloaliphatic triamines according to German Offenlegungsschrift No. 2,614,244. It is also possible to use hydrazine and substituted hydrazines such as methyl hydrazine, N,N'-dimethyl hydrazine and homologues thereof; and also acid dihydrazides such as carbodihydrazide, oxalic acid dihydrazide, the dihydrazides of malonic acid, succinic acid, glutaric acid, adipic acid, $\beta$-methyl adipic acid, sebacic acid, hydracrylic acid and terephthalic acid; semicarbazido alkylene hydrazides such as $\beta$-semicarbazido propionic acid hydrazide (German Offenlegungsschrift No. 1,770,591); semicarbazido alkylene carbazinic esters such as 2-semicarbazido ethyl carbazinic ester (German Offenlegungsschrift No. 1,918,504) or even amino-semicarbazide compounds such as $\beta$-aminoethyl semicarbazido carbonate (German Offenlegungsschrift No. 1,902,931). To control their reactivity the amino groups may be completely or partly blocked by aldimine or ketimine groups (U.S. Pat. No. 3,734,894 and German Offenlegungsschrift No. 2,637,115).

Examples of suitable aromatic diamines include: bis-anthranilic acid esters according to German Offenlegungsschriften Nos. 2,040,644 and 2,160,590; 3,5- and 2,4-diamino-benzoic acid esters according to German Offenlegungsschrift No. 2,025,900; the diamines containing ester groups described in German Offenlegungsschriften Nos. 2,040,650; 2,160,589 and 1,803,635 (substantially corresponding to U.S. Pat. Nos. 3,681,290 and 3,736,350); the diamines containing ether groups according to German Offenlegungsschriften Nos. 1,770,525 and 1,809,172 (substantially corresponding to U.S. Pat. Nos. 3,654,364 and 3,736,295); 2-halogen-1,3-phenylene diamines optionally substituted in the 5-position (German Offenlegungsschriften Nos. 2,011,722; 2,025,896 and 2,065,869); 3,3'-dichloro-4,4'-diaminodiphenylmethane; tolylene diamine, 4,4'-diaminodiphenylmethane; 4,4'-diaminodiphenyl disulfides (German Offenlegungsschrift No. 2,404,976); di-aminodiphenyl dithio ethers (German Offenlegungsschrift No. 2,509,404); aromatic diamines substituted by alkylthio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166) and the high-melting diamines described in German Offenlegungsschrift No. 2,635,400. Examples of suitable aliphatic-aromatic diamines include the aminoalkyl thio anilines according the German Offenlegungsschrift No. 2,734,574.

Other suitable chain-extenders include compounds such as 1-mercapto-3-aminopropane; optionally substituted amino acids such as glycine, alanine, valine, serine and lysine; and optionally substituted dicarboxylic acids such as succinic acid, adipic acid, phthalic acid, 4-hydroxy phthalic acid and 4-amino phthalic acid.

In addition, isocyanate-monofunctional compounds may be used as so-called "chain-terminators" in proportions of from 0.01 to 10% by weight, based on polyurethane solids. Examples of such monofunctional compounds include: monoamines such as butyl- and dibutylamine, octylamine, stearylamine, N-methyl stearylamine, pyrrolidine, piperidine and cyclohexylamine; monoalcohols such as butanol, 2-ethyl hexanol, octanol, dodecanol, the various amyl alcohols, cyclohexanol; and ethylene glycol monoethyl ether.

The present invention is characterized by the use of the denatured biomass described in detail above as a reactive organic filler in the polyisocyanatepolyaddition process. In numerous formulations, it is possible in the process of the invention to use the biomass in non-denatured form because they are irreversibly denatured in situ very rapidly by the polyisocyanate present in the reaction mixture and, accordingly, are chemically incorporated in completely denatured and odorless form into the final polyurethane plastic. So far as processing is concerned, however, the use of the nondenatured biomasses naturally involves the release of an unpleasant odor and, in some cases, is also unacceptable for physiological reasons. In the present invention, therefore, it is preferred to denature the biomasses in a separate step by one of the processes described in detail above and to use them only in this denatured form as a filler for polyurethane-forming reaction mixtures.

Various additives and auxiliaries may also be used in the process of the present invention.

Water and/or readily volatile inorganic or organic substances may be used as blowing agents. Examples of organic blowing agents include: acetone; ethyl acetate; halogen-substituted alkanes such as methylene chloride, chloroform, ethylidene chloride, vinylidene chloride, monofluorotrichloromethane, chlorodifluoromethane, dichlorodifluoromethane; butane; hexane; heptane and diethyl ether. Examples of inorganic blowing agents include: air, $CO_2$ and $N_2O$. A blowing effect may also be obtained by adding compounds which decompose at temperatures above room temperature giving off gasses such as nitrogen. Such compounds include, for example, azo compounds such as azodicarbonamide or azoisobutyronitrile. Other examples of blowing agents and information on the use of blowing agents may be found in Kunststoff-Handbuch, Volume VII, by Vieweg-Hochtlen, Carl-Hanser-Verlag, Munich, 1966, for example, on pages 108 and 109, 453 to 455 and 507 to 510.

Known catalysts for the polyisocyanate-polyaddition process may also be used in the process of the invention. Examples of such catalysts include: triethylamine; tributylamine; N-methyl morpholine; N-ethyl morpholine, N,N,N',N'-tetramethyl ethylene diamine; pentamethyl diethylene triamine and higher homologs (German Offenlegungsschriften Nos. 2,624,527 and 2,624,528); 1,4-diazabicyclo-(2,2,2)-octane; N-methyl-N'-dimethylaminoethyl piperidine; bis-(dimethylaminoalkyl)-piperazines (German Offenlegungsschrift No. 2,636,787); N,N-dimethyl benzylamine; N,N-dimethyl cyclohexylamine; N,N-diethyl benzylamine; bis-(N,N-diethylaminoethyl)-adipate; N,N,N',N'-tetramethyl-1,3-butane diamine; N,N-dimethyl-β-phenyl ethylamine; 1,2-dimethyl imidazole; 2-methyl imidazole, monocyclic and bicyclic amidines (German Offenlegungsschrift No. 1,720,633); bis-(dialkylamino)-alkyl ethers (U.S. Pat. No. 3,330,782, German Auslegeschrift No. 1,030,558 and German Offenlegungsschriften Nos. 1,804,361 and 2,618,280); and tertiary amines containing amide groups (preferably formamide groups) according to German Offenlegungsschriften Nos. 2,523,633 and 2,732,292. Suitable catalysts also include known Mannich bases of secondary amines such as dimethylamine and aldehydes, preferably formaldehyde, or ketones such as acetone, methyl ethyl ketone or cyclohexanone, and phenols such as phenol, nonyl phenol or bisphenol.

Examples of tertiary amines containing isocyanate-reactive hydrogen atoms suitable for use as catalysts include: triethanolamine; triisopropanolamine; N-methyl diethanolamine; N-ethyl diethanolamine; N,N-dimethyl ethanolamine; the reaction products thereof with alkylene oxide such as propylene oxide and/or ethylene oxide; and also secondary tertiary amines according to German Offenlegungsschrift No. 2,732,292.

Other suitable catalysts include: silaamines containing carbon silicon bonds of the type described, for example, in German Pat. No. 1,229,290 (substantially corresponding to U.S. Pat. No. 3,620,984) such as 2,2,4-trimethyl-2-silamorpholine and 1,3-diethylaminomethyl tetramethyl disiloxane.

Other suitable catalysts include: nitrogen-containing bases such as tetraalkyl ammonium hydroxides; alkali metal hydroxides such as sodium hydroxide; alkali metal phenolates such as sodium phenolate; or alkali metal alcoholates such as sodium methylate. Hexahydrotriazines may also be used as catalysts (German Offenlegungsschrift No. 1,769,043).

The reaction between NCO groups and Zerewitinoffactive hydrogen atoms is also greatly accelerated by lactams and azalactams, an associate between the lactam and the compound containing acid hydrogen initially being formed. Such associates and the catalytic effect thereof are described in German Offenlegungsschriften Nos. 2,062,288; 2,062,289; 2,117,576 (substantially corresponding to U.S. Pat. No. 3,758,444); 2,129,198; 2,330,175 and 2,330,211.

It is also possible to use organometallic compounds, particularly organotin compounds, as catalysts. In addition to sulfur-containing compounds such as di-n-octyl tin mercaptide (German Auslegeschrift No. 1,769,367 and U.S. Pat. No. 3,654,927), preferred organotin compounds include: tin(II) salts of carboxylic acids such as tin(II)acetate, tin(II)octoate, tin(II)ethyl hexoate and tin(II)laurate; and tin(IV) compounds such as dibutyl tin oxide, dibutyl tin dichloride, dibutyl tin diacetate, dibutyl tin dilaurate, dibutyl tin maleate or dioctyl tin diacetate.

The above-mentioned catalysts may, of course, be used in the form of mixtures. In this respect, combinations or organometallic compounds and amidines, aminopyridines or hydrazino pyridines (German Offenlegungsschriften Nos. 2,434,185; 2,601,082 and 2,603,834) are of particular interest.

Further representatives of catalysts suitable for use in the process of the invention and information on the way in which they work may be found in Kunststoff-Handbuch by Vieweg-Hochtlen, Volume VII, Carl-Hanser-Verlag, Munich, 1966, for example on pages 96 to 102.

The catalysts are generally used in a quantity of from about 0.001 to 10% by weight based on the reaction mixture as a whole.

In general, however, the metal ions and amine groups already present in the biomasses themselves have an accelerating effect on the polyisocyanatepolyaddition reaction.

Surface-active additives such as emulsifiers and foam stabilizers, may also be used in the process of the invention. Examples of suitable emulsifiers include the sodium salts of castor oil sulfonates or salts of fatty acids with amines such as diethylamine oleate or diethanolamine stearate. Alkali metal or ammonium salts of sulfonic acids such as dodecyl benzene sulfonic acid or dinaphthyl methane disulfonic acid or of fatty acids such as ricinoleic acid or of polymeric fatty acids may also be used as surface-active additives.

Particularly suitable foam stabilizers include polyether siloxanes, particularly the water-soluble types. The structure of these compounds is generally such that a copolymer of ethylene oxide and propylene oxide is attached to a polydimethyl siloxane residue. Such foam stabilizers are described, for example, in U.S. Pat. Nos. 2,834,748; 2,917,480 and 3,629,308. In many cases, polysiloxane-polyoxyalkylene copolymers branched through allophanate groups according to German Offenlegungsschrift No. 2,558,523 are particularly suitable.

Reaction retarders such as acid-reacting substances like hydrochloric acid or organic acid halides may be used in the process of the invention. Known cell regulators such as paraffins, fatty alcohols or dimethyl polysiloxanes and also known pigments, dyes and flameproofing agents such as tris-chloroethyl phosphate, tricresyl phosphate or ammonium phosphate and polyphosphate may also be used. Additionally, stabilizers against the effects of aging and weather, plasticizers and fungistatic and bacteriostatic substances, as well as fillers such as barium sulfate, kieselguhr, carbon black or whiting may be used in the invention.

Further examples of surface-active additives and foam stabilizers, cell regulators, reaction retarders, stabilizers, flameproofing agents, plasticizers, dyes, fillers, fungistatic and bacteriostatic substances which may optionally be used in the process of the invention and information on the way in which these additives are used and on the respective modes of action thereof may be found in Kunststoff-Handbuch by Vieweg-Hochtlen, Volume VII, Carl-Hanser-Verlag, Munich, 1966, for example, on pages 103 to 113.

In the process of producing polyurethane plastics in accordance with the invention, the denatured biomasses (component B) used as reactive organic fillers may be used both on their own and in admixture with each of the other components. If the biomasses still contain free groups having reactive hydrogen atoms, the number of free isocyanate groups begins to decrease very rapidly after the powder-form biomasses have been stirred into monomeric, liquid polyisocyanates, accompanied by an increase in viscosity. Accordingly, where the polyisocyanates (component A) and the reactive organic fillers (component B) are to be used together in the process of the invention, it is advisable either to carry out preliminary mixing just before the reaction with the compounds containing isocyanate-reactive hydrogen atoms (component C) or to size-reduce the polyadduct which often hardens on prolonged standing before it is further reacted. By contrast, the biomasses, especially when they are finely powdered (mean particle size preferably below 100 m$\mu$ and more preferably below 20 m$\mu$) form with liquid polyhydroxyl compounds (component C in the process of the invention) suspensions which remain free from sedimentation from several days to many months in some cases. The storage stability of these dispersions is increased to several months by using powdered denatured biomasses containing free isocyanate groups and reacting them with hydroxyl groups of the polyhydroxyl compounds by briefly heating the suspension, preferably to temperatures of from 80° to 150° C.

It is surprising that NCO-containing prepolymers of the above-mentioned suspensions and an excess of polyisocyanate are also extremely stable in storage while, as mentioned above, mixtures of the biomasses with polyisocyanates show fairly poor stability in storage.

The optionally chemically modified biomasses are generally used in the process of the invention in quantities of from 2 to 90% by weight, preferably from 5 to 40% by weight, and more preferably from 10 to 30% by weight, based on the sum of components A, B and C. In most cases, they increase the hardness of the polyurethane end products and markedly increase their tensile strength so that there is frequently little or no need to use the conventional low molecular weight chain-extending agents. Given very large amounts of modified biomass, particularly in excess of 40% by weight, based on the end product, extremely inexpensive new starting materials for plastics are obtained, optionally in powder-form which in many cases may be thermoplastically formed.

In the process of the invention, the reaction components A, B and C may be reacted by the known one-shot process, by the prepolymer process or by the semi-prepolymer process with or without the use of machines. Machines of the type described, for example, in U.S. Pat. No. 2,764,565 may be used with the reaction components. Particulars of processing machines which also may be used in the invention may be found in Kunststoff-Handbuch, Volume VII, published by Vieweg-Hochtlen, Carl-Hanser-Verlag, Munich, 1966, for example on pages 121 to 205. It is, of course, also possible using the process of the present invention to produce polyisocyanurate plastics (from components A and B).

When the process of the invention is used to produce foams, it is possible to carry out foaming with or without open or closed molds. When molds are used, the reaction mixture is simply introduced into the mold. Suitable mold materials include metals such as aluminum, or plastics such as epoxide resins. The foamable reaction mixture foams in the mold and forms a molding. In-mold foaming may be used to produce a molding having a cellular structure at the surface and also to produce a molding having a compact skin and a cellular core. When foaming in molds, it is possible to introduce the foamable reaction mixture into the mold in such a quantity that the foam formed just fills the mold. However, it is also possible to introduce into the mold more foamable reaction mixture than is required for filling the interior of the mold with foam. This particular technique is known as "overcharging" and is known, for example, from U.S. Pat. Nos. 3,178,490 and 3,182,104.

Where foaming is carried out in molds, known "external release agents" such as silicone oils are frequently used. However, it is also possible to use so-called "internal release agents", optionally in admixture with external release agents, as described, for example, in German Offenlegungsschriften Nos. 2,121,670 and 2,307,589.

It is also possible to produce cold-hardening foams (cf. British Pat. No. 1,162,517 and German Offenlegungsschrift No. 2,153,086). Additionally, it is possible to produce foams by block foaming or by the known laminator process.

In one particular embodiment of the invention, the TDI residue powders are used as reactive fillers in the production of chipboard by bonding or impregnating lignocellulose-containing starting materials with polyisocyanates.

It is known that boards or moldings may be produced in high-temperature presses by bonding lignocellulose-containing fibers, chips or layers. Condensation products of formaldehyde with urea, melamine or phenol have generally been used as binders for this purpose. However, these known lignocellulose-containing materials are unsatisfactory in regard to durability and behavior in the presence of moisture under conditions to which they are exposed especially in the construction industry. In order to improve the stability and moisture resistance of the products and also to increase their mechanical strengths, it has been proposed to use polyisocyanates as binders and/or impregnating agents. In addition to qualityimproving properties, polyisocyanates have far-reaching processing advantages as binders, as disclosed in German Offenlegungsschrift No. 2,109,686. Suitable binders include the above-mentioned polyisocyanates, although it is preferred, in accordance with German Offenlegungsschrift No. 2,711,858, to use crude diphenylmethane diisocyanate, particularly a product having a viscosity at 25° C. of from 50 to 600 mPas and an NCO content of from 28 to 32% by weight and which contains from 35 to 70% by weight of diisocyanatodiphenylmethanes of which 1 to 8% by weight are made up by the 2,4'-isomer and from 0 to 2% by weight are made up by the 2,2'-isomer.

It is known that polyisocyanates have significant advantages over conventional binder resins for the production of chipboard or moldings based on lignocellulose-containing materials by virtue of the fundamentally different binding mechanism.

Since the polyisocyanate binders are anhydrous binders, there is much less water evaporated in the high temperature press which, together with the high reactivity of the polyisocyanate to begin with provides for very short pressing times. Additionally, intensive drying of the chips is not necessary which makes the process less expensive. Furthermore, where polyisocyanate binders are used, the components in dust form of the lignocellulose-containing starting material create problems which thus results in better utilization of the starting material and reduces the danger of operational disturbances during production of the chipboard. In addition, no effluent problems arise because a closed system is used. For the same quantity of binder, the flexural and transverse tensile strengths of the materials are increased and their swellability under the effect of moisture and water is reduced. In addition, binding polyisocyanates with agricultural waste materials which are otherwise difficult to bind such as straw, rice husks, alfa grass, etc. contributes universally towards reducing raw material supply and pollution control problems.

In particular, the use of polyisocyanates reduces or eliminates the serious problem of pollution and endangering of health by the formaldehyde gas escaping from chipboard bonded with urea/formaldehyde resins or (optionally modified) melamine/urea/formaldehyde resins.

Previously, it has been possible to utilize the advantages of polyisocyanates as binders for lignocellulose-containing materials only to a limited extent on an industrial scale because, although results satisfactory in many respects may be obtained using conventional commercial-grade polyisocyanates, these polyisocyanates are frequently much more expensive than phenol/formaldehyde and urea/formaldehyde resins. If, in accordance with the invention, some of the necessary polyisocyanates are replaced by the modified biomasses which, due to the numerous reactive groups thereof, also act as binders, not only are materials superior in many respects to the chipboard and moldings obtained using conventional polyisocyanates as binders obtained but also these materials may be produced particularly economically by using biomasses.

Examples of suitable lignocellulose-containing starting materials which, according to the invention, may be bound using a mixture of liquid polyisocyanate and optionally chemically modified denatured biomass include: wood, bark, cork, bagasse, straw, flax, bamboo, alfa grass, rice husks, sisal and coconut fibers. The material may be present in the form of granulates, chips, fibers or powder and may have a water content of from 0 to 35% by weight, preferably from 5 to 25% by weight. From about 1 to 70% by weight, preferably from 1.5 to 8% by weight of polyisocyanate and from 2 to 80% by weight, preferably from 5 to 40% by weight, and more preferably from 10 to 30% by weight, of finely divided, optionally chemically modified denatured biomass, based on the total weight of the molding, are added to it in any order followed by processing to form panels or moldings. Processing is generally carried out under heat and pressure.

Laminated panels or moldings also may be produced in the same way from veneers, papers or fabrics. Laminated panels or moldings may be produced in accordance with the invention from veneers and strip-form, bar-form or rod-form center layers (so-called "cabinet-making boards") by treating the veneers as described above with a polyisocyanate and the biomass and subsequently pressing them with the center layers, generally at elevated temperature and pressure. It is preferred to use temperatures of from 100° to 250° C. and, more preferably from 130° to 200° C. The initial pressure applied is preferably from 5 to 150 bars. The pressure subsequently falls, generally towards zero, in the course of the pressing operation.

According to the invention, the binder combinations (liquid polyisocyanate and powdered biomass) may also be used in combination with polyhydroxyl compounds of the type known from polyurethane chemistry in an NCO:OH ratio of from 1:2 to 10:1, preferably from 1.5:1 to 1:1.

It is possible to use the individual components separately or in the form of a reactive mixture. According to the invention, it is preferred to premix the polyhydroxyl compound with the biomass to form a storable suspension. It is also possible to add known blowing agents in a quantity of from about 0.5 to 30% by weight, based on binder or impregnating agent, and/or to add other additives which influence foam formation or the chemical reaction between polyisocyanates, lignocellulose-containing material and optionally polyhydroxyl compounds such as stabilizers, catalysts and activators in a quantity of from 0.05 to 10% by weight, based on binder or impregnating agent. Starting materials which may optionally be used in the production of lignocellulose-containing moldings are described in detail above in connection with the production of polyurethane plastics.

The binder combinations containing liquid polyisocyanate and finely divided denatured biomass used in accordance with the present invention in the production of panels or moldings from lignocellulose-containing material may also be combined with the aqueous solutions of condensation products of formaldehyde with urea and/or melamine and/or phenol hitherto predominantly used in the woodworking industry. The binder combinations may also be used with the less widely used binders and impregnating agents such as sulfite waste liquor or tannin. The binders of the invention may be mixed with these additional binders in a ratio of from 1:10 to 10:1, preferably from 1:5 to 5:1. The binders of the present invention and the additional binders may be used either separately or even in admixture.

Such combinations are of particular advantage in the production of laminated panels having particular properties. For example, conventional adhesives (used either individually or together with the polyisocyanate mixtures) may be added to the outer layers while combinations of liquid polyisocyanate and powdered biomass (used either individually or together with conventional adhesives) used in accordance with the invention may be added to one or more inner layers followed by pressing.

Due to their outstanding mechanical properties and reduced inflammability, the panels or moldings produced in accordance with the invention based on lignocellulose-containing starting materials are especially suitable for use in the construction industry. In order to provide resistance to fungi, insects or fire to the panels or moldings, it is possible to add to the binders conventional organic or inorganic protectives either in pure form or in solution in quantities of from about 0.05 to 30% by weight, preferably from 0.5 to 20% by weight, based on lignocellulose-containing starting materials. Suitable solvents include water or organic solvents such as residue oils from petroleum refining, chlorinated hydrocarbons, etc. In general, this does not affect the quality of bonding. In contrast to panels bonded with phenol/formaldehyde resins, the materials produced in accordance with the invention are advantageously not affected either by efflorescence of salts or by so-called "bleeding".

By virtue of the high bond strength of the binders used in accordance with the invention, moldings impregnated or bonded with them tend to adhere to the surfaces of the hot presses or molds. This may be avoided by means of release agents which are added to the binder. Another solution is to apply the release agents either in pure form or in solution to the metallic surfaces coming into contact with the pressings or to the surface of the molding. Suitable release agents include generally known substances for this purpose. However, it is preferred, in accordance with German Offenlegungsschrift No. 2,325,926, to use compounds which in isocyanates catalyze the formation of isocyanurates such as phenol-Mannich bases, derivatives of hexahydrotriazine or alkali metal salts of carboxylic acids. In comparison with conventional binders based on phenol/formaldehyde or urea/formaldehyde resins, significant improvements in the manufacture of chipboard with respect to both mechanical properties and processing properties may be obtained using binder combinations according to the invention. Thus, it is possible in the case of wood chipboard to obtain from 30 to 50% increase in flexural strength (in addition to improvements in other mechanical properties) for the same quantity of binder as in phenol/formaldehyde or urea/formaldehyde resins or to obtain the same mechanical property spectrum with a 25 to 70% reduction in the concentration of binder.

In all the described embodiments of the process of the invention, the denatured biomass may also be used with powder-form azulmic acids in various quantitative ratios, for example from 90:10 to 10:90.

The process of the present invention is illustrated by the following Examples in which the quantities represent parts by weight or percent by weight unless otherwise indicated.

EXAMPLES

Example 1

(a) Denaturing of the biomass:

1000 g of a bacterial activated sludge (solids content approximately 8.5%) emanating from a fully biological purification plant for industrial and communal effluents and consisting of a variety of microorganisms with traces of the following plant protection agents (herbicides) as impurities: N-methyl isopropyl carbamate (0.5 g); 4-amino-6-t-butyl-3-methyl thio-4,5-dihydro-1,2,4-triazin-5-one (0.5 g) and N-(3-benzthiazolyl)-N,N'-dimethyl urea (0.5 g) are initially heated with intensive stirring to 80° C. with 100 g of 30% formalin (1 mol) and 25 g of 85% phosphoric acid in a ground glass flask. The cell walls of the bacteria are thus ruptured and the plant protection agents present are deactivated and hydrolyzed by reaction of the $NH_2$- or NH-functional groups thereof with formaldehyde through N-methylolation (N—$CH_2$—O—$CH_2$—N) or methylene linkage (N—$CH_2$—N). After this primary reaction, samples are taken and centrifuged. By titrating the formaldehyde in the filtrates, it is analytically determined that 0.05 mol of formaldehyde has been consumed. A solution of 60 g of urea (1 mol) in 100 g of water and 10 g of 30% formalin (0.1 mol) are then added to the reaction mixture. After condensation for 15 minutes at 70° C., the mixture is cooled over a period of 30 minutes to a temperature of 45° C. and a readily filterable, powder-form biomass mixed condensate is obtained. This biomass mixed condensate is neutralized using calcium hydroxide as a result of which substantially insoluble calcium phosphate precipitates in very finely divided form in the biomass condensate dispersion. The powder-form product is filtered off and washed with a 2% aqueous ammonia solution. The product is then dried under reduced pressure at 70° C., giving a substantially odorless powder in a yield of 176 g. The nitrogen content amounts to 13.4%.

Based on the mixture of condensed proteins, enzymes, nucleic acids and other cell ingredients, the process product contains approximately 39% by weight of polymethylene ureas having the following idealized structure:

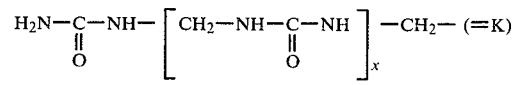

wherein x is unknown and the fraction of (K) fused to functional groups of the biomass cannot at present be analytically determined due to the insolubility of the biomass mixed condensate.

Biological sterility tests on the powdered biocondensates and also the filtrates show that the powdered products and the filtrates are free from bacteria and pathogenic germs.

(b) Process according to the invention:

30 g of the denatured biomass are dispersed at 120° C. in 70 g of a polyether polyol of trimethylol propane and propylene oxide (OH number: 54). After cooling to room temperature, the dispersion is mixed with 2.7 g of water, 1.0 g of a commercial foam stabilizer ("OS 15" of Bayer AG) based on a polyether polysiloxane, 0.2 g of triethylene diamine and 0.2 g of the tin(II) salt of 2-ethyl caproic acid. 36.3 g of tolylene diisocyanate (80% 2,4- and 20% 2,6-isomer) are added to the resulting mixture. The components are then thoroughly mixed by means of a high-speed stirrer. Foam formation begins after a cream time of 10 seconds. A grey, flexible and elastic open-cell polyurethane foam having a unit weight of about 40 kg/$m^3$ is formed.

Example 2

A dispersion of 40 g of the biomass cocondensate synthesized in accordance with Example 1(a) in 200 g of a polyester of adipic acid and ethylene glycol (OH number: 56) is prepared in the same way as in Example 1(b). The dispersion is then dehydrated for 30 minutes at 130° C. The temperature is allowed to fall to 100° C., 80 g of finely powdered 4,4'-diisocyanato-diphenylmethane are added all at once and the mixture is maintained at 120° C. for 12 minutes. 18 g of 1,4-butane diol (chain-extending agent) are stirred into the resulting NCO-prepolymer. The mixture is then rapidly poured into a metal mold and after-heated at 100° C. in a heating cabinet. The highly elastic polyaddition product may be removed from the mold after only 20 minutes. After-heating for 24 hours at 110° C. gives a test plate which is highly elastic and tear-resistant and, compared with an elastomer plate minus the filler according to the present invention, shows a 50% slower burn-up rate.

Example 3

(a) Production of a biomass polyaddition product:

100 parts of a dried, foul-smelling purified sludge powder (ignition residue 8.5%) emanating from a purification plant are ground to a mean particle size of 20 m$\mu$ by means of an air-jet mill, followed by the addition in a stirrer-equipped apparatus of 50 parts of a 30% solution in toluene of a tolylene diisocyanate isomer mixture (2,4:2,6-isomer ratio=65:35). The reaction of the H-acid groups of the finely divided biomass with the isocyanate groups is carried out over a period of 60 minutes by gradually increasing the temperature to 110° C.

After cooling, the suspended reaction product is filtered under suction, washed twice with a little acetone and dried under reduced pressure at 120° C. on plates in a heating cabinet. A very finely divided purified sludge/isocyanate polyadduct is obtained in the form of a powder which is odorless and sterilized.

(b) Production of a polyadduct containing free NCO groups:

The procedure is as in Example 3(a) except that twice the quantity of tolylene diisocyanate isomer mixture in the form of a 50% solution in anhydrous toluene is used. Removal of the solvent leaves a finely divided, odorless, purified sludge polyadduct which, although free from monomeric tolylene diisocyanate, contains 9.3% by weight of free isocyanate groups bound to the biomass.

(c) Process according to the invention:

Production of two flexible polyurethane foams from the purified sludge powders modified in accordance with Examples 3(a) and 3(b):

Quantities of 60 parts of the very finely powdered, odorless, purified sludge polyadducts are suspended by intensive stirring at room temperature in 160 parts of a trimethylolpropane-started polyether of propylene oxide and ethylene oxide (OH number: 34; approximately 80 mol percent of primary OH groups). This is followed by the successive addition of 6.0 parts of water, 0.4 part of triethylene diamine, 0.6 part of 2-dimethylaminoethanol, 2.0 parts of a commercial foam stabilizer ("OS 15" of Bayer AG) and 0.4 part of tin(II) octoate. 72 parts and 65 parts, respectively, for the two foams of tolylene diisocyanate (2,4-:2,6-isomer ratio=70:30) are stirred into this mixture.

After cream times of from 10 to 12 seconds in either case, the reaction mixture becomes cream-like. The foams have rise times of from 70 to 85 seconds and gel times of from 130 to 150 seconds.

The fully reacted foams are completely odorless and have the following mechanical properties:

|  |  | 3(a) | 3(b) |  |
| --- | --- | --- | --- | --- |
| Gross density | (DIN 53420) | 35 | 34 | kg/m$^3$ |
| Tensile strength | (DIN 53571) | 167 | 163 | KPa |
| Elongation at break | (DIN 53571) | 175 | 182 | % |
| Compression hardness | (DIN 53577) | 6.1 | 5.9 | KPa |

By comparison, a flexible foam produced in the same way with the nonisocyanate-modified finely ground, purified sludge powder has an unpleasant odor which rules out any practical application.

A flexible foam produced without purified sludge or purified sludge polyadducts for comparison has a from 18 to 21% lower compression hardness and less favorable burning properties.

Example 4

This Example illustrates the production of a rigid foam using the very finely divided, but nonisocyanate-premodified purified sludge powder characterized in Example 3.

A freshly prepared mixture of 100 parts of a polyether obtained by propoxylating sucrose (OH number: 380; water content: 2.1%), 70 parts of a dried, strong smelling purified sludge powder ground to a mean particle size of 20μ in an air-jet mill, 0.7 part of N,N-dimethylcyclohexylamine and 40.0 parts of monofluorotrichloromethane is very intensively mixed for from 10 to 12 seconds at room temperature with 38 parts of a liquid, technical diphenylmethane diisocyanate (NCO content: 30%) and the reaction mixture poured into an open mold.

After 95 seconds, the foam has gelled and has a unit weight of 24 kg/m$^3$.

The tough rigid foam produced in accordance with the invention has a uniform pore structure and, unlike the flexible comparison foam (see Example 3 above), is surprisingly odorless immediately after foaming even without preliminary isocyanate modification of the purified sludge powder.

Example 5

(a) Production of a 40% dispersion of activated sludge/TDI residue polyadducts in castor oil:

Formulation: 200 parts of activated sludge powder as in Example 3, mean particle size 20μ; 200 parts of TDI residue powder (mean particle size 5μ, NCO content 8.4% by weight) which had accumulated in the commercial production of 2,4-, 2,6-tolylene diisocyanate (isomer mixture 80:20) after reaction of the free NCO-groups of the distillation residue with water and which was subsequently ground very finely by dry grinding in an air-jet mill; 11 parts of ethanolamine; 6 parts of hydrazine monohydrate and 643 parts of castor oil.

The reaction is carried out in a stirrer-equipped apparatus at from 80° to 100° C. by stirring the activated sludge and TDI residue powders into the castor oil and adding the ethanolamine/hydrazine mixture dropwise.

After from 40 to 60 minutes, no more free isocyanate may be detected.

The nonsedimenting dispersion has a viscosity of 4590 (1240) mPas for a solids content of 40 (20) % and may be stored indefinitely.

(b) Production of a flexible polyurethane sheet in accordance with the invention:

710 Parts of the above 40% dispersion; 80 parts of a TDI residue obtained as in (a), mean particle size 10μ, NCO content=13.9% by weight; 108 parts of castor oil; and 80 parts of ethyl acetate are reacted as described in (a) and the ethyl acetate distilled off.

33 parts of a liquid, technical diphenylmethane diisocyanate (NCO content=30%) were intensively stirred in per 100 parts of this dispersion. The reaction mixture was then knife-coated onto a smooth substrate (glass or steel belt) in a layer thickness of 0.5 mm and reacted at from 120° to 160° C. in a heating cabinet or drying tunnel.

The very smooth, glossy sheet is odorless and has the following physical properties:

| Test strength | 18.3 MPa |
| --- | --- |
| Elongation at break | 85% |
| Tear propagation resistance | 174 N/cm |
| Shore A hardness | 20 |

In a comparison test using the same formulation minus the activated sludge polyadduct, a deliquescent film having no useful strength is obtained.

The reaction mixture according to the present invention of Example 5(b) has a pot life at room temperature of about 60 seconds and may even be used as an adhesive having excellent properties.

What is claimed is:

1. A process for the production of optionally cellular polyurethane plastics by the isocyanate polyaddition process comprising reacting:
   (A) a polyisocyanate;
   (B) a reactive organic filler comprising a biomass based on microorganisms and derivatives or decomposition products thereof which has been irreversibly denatured and deodorized by reaction with isocyanates and/or by reaction with carbonyl compounds and compounds capable of aminoplast and/or phenoplast formation; optionally
   (C) a low molecular weight and/or relatively high molecular weight compound containing isocyanate-reactive hydrogen atoms; and optionally
   (D) blowing agents, catalysts and additives.

2. A process as claimed in claim 1 wherein said biomass has been denatured by
   (a) condensing said biomass in a first reaction phase in aqueous medium with carbonyl compounds, thiocarbonyl compounds and/or carbonyl compounds which are in dissociation equilibrium with low molecular weight, uncondensed N-alkylol compounds, optionally in the presence of additives and optionally with hydrolytic degradation or rupturing of the cell walls present in the biomass;
   (b) reacting in a second reaction phase unreacted carbonyl compounds, thiocarbonyl compounds and/or carbonyl compounds which are in equilibrium with low molecular weight uncondensed N-alkylol compounds from said first reaction phase with aminoplast formers optionally containing N-alkylol groups, or with phenoplast formers, said second reaction phase being carried out in aqueous medium optionally in the presence of a catalyst, chain-terminators and/or additives.

3. A process as claimed in claim 2 wherein the products of steps (a) and (b) are freed from undesirable substances still present and/or subjecting said products to an after-treatment comprising treating with ammonia, primary or secondary amines in either the gas or liquid phase, or washing with aqueous ammonia/hydrazine solutions or with aqueous cyanide solutions.

4. A process as claimed in claim 1 wherein said biomass has been denatured by reacting at a temperature of at least 50° C.:
   (a) from 5 to 98% by weight of said biomass based on (a) and (b) with
   (b) from 95 to 2% by weight of a compound containing isocyanate groups based on (a) and (b); optionally in the presence of
   (c) water and/or an organic solvent; and optionally in the presence of
   (d) organic and/or inorganic additives.

5. A process as claimed in claim 4 wherein said compound containing isocyanate groups comprises a substantially monomer-free, cross-linked, powder-form distillation residue containing from 1 to b 15% by weight of NCO groups, said residue being substantially insoluble in organic solvents and incapable of being melted without decomposing, optionally said residue having been stirred into water, and subsequently ground to a particle size of less than 2 mm.

6. A process as claimed in claim 5 wherein said residue is obtained during the removal of monomeric tolylene diisocyanates by distillation from a crude phosgenation product of tolylene diamines.

7. A process as claimed in claim 4 wherein said biomass and said compound containing isocyanate groups are used in quantities of 20 to 97% by weight and 80 to 3% by weight, respectively, based on the sum of said biomass and compound containing isocyanate groups.

8. A process as claimed in claim 4 wherein said reactive organic filler contains free isocyanate groups.

9. A process as claimed in claim 6 wherein said reactive organic filler contains free isocyanate groups.

10. A process as claimed in claim 1 wherein said reactive organic filler is used in the form of a dispersion in said low molecular weight and/or relatively high molecular weight compound containing isocyanate-reactive hydrogen atoms.

11. A process as claimed in claim 2 wherein said reactive organic filler is used in the form of a dispersion in said low molecular weight compound containing isocyanate-reactive hydrogen atoms.

12. A process as claimed in claim 4 wherein said reactive organic filler is used in the form of a dispersion in said low molecular weight compound containing isocyanate-reactive hydrogen atoms.

13. A process as claimed in claim 6 wherein said reactive organic filler is used in the form of a dispersion in said low molecular weight compound containing isocyanate-reactive hydrogen atoms.

14. A process as claimed in claims 1, 2, 4, 6, 8 or 13 wherein a lignocellulose-containing material is used as an additional reactive filler.

* * * * *